(12) United States Patent  
Ronca et al.

(10) Patent No.: US 7,421,153 B1  
(45) Date of Patent: Sep. 2, 2008

(54) IMAGE AND DATA PROCESSING SYSTEM

(75) Inventors: James G. Ronca, Decatur, GA (US); David T. Frew, Fort Mill, SC (US)

(73) Assignee: Bank of America Corporation, Charlotte, NC (US)

( * ) Notice: Subject to any disclaimer, the term of this patent is extended or adjusted under 35 U.S.C. 154(b) by 700 days.

(21) Appl. No.: 10/827,203

(22) Filed: Apr. 19, 2004

Related U.S. Application Data

(63) Continuation-in-part of application No. 10/284,607, filed on Oct. 31, 2002, now abandoned.

(60) Provisional application No. 60/369,880, filed on Apr. 5, 2002.

(51) Int. Cl.
*G06K 9/54* (2006.01)
*G06K 9/00* (2006.01)
*G06K 9/60* (2006.01)

(52) U.S. Cl. .................................. 382/305; 382/137

(58) Field of Classification Search ................. 382/137, 382/305, 306, 307; 715/744; 709/203; 705/1.7, 705/35, 71; 713/201; 707/3
See application file for complete search history.

(56) References Cited

U.S. PATENT DOCUMENTS

| | | | | | |
|---|---|---|---|---|---|
| 5,678,046 | A | * | 10/1997 | Cahill et al. | 707/200 |
| 6,157,943 | A | * | 12/2000 | Meyer | 709/203 |
| 7,133,842 | B2 | * | 11/2006 | Harif | 705/37 |
| 2002/0010867 | A1 | * | 1/2002 | Schaefer et al. | 713/201 |
| 2004/0111730 | A1 | * | 6/2004 | Apte | 719/330 |

* cited by examiner

*Primary Examiner*—Yon Couso
(74) *Attorney, Agent, or Firm*—Moore & Van Allen, PLLC; Steven B. Phillips; Michael A. Springs

(57) ABSTRACT

A system and method for processing financial information is provided. A client request may be received through an application program interface (API). A first set of data based on the client request may be retrieved through the API from a first information repository comprising information on debit transactions and credit transactions. The first set of results may be transmitted to the client application for display. A second client request based on the first set of results may be received through the API from the client application, and a second set of data may be retrieved through the API from a second information repository comprising information on credit transactions and component deposit items. The second set of results may be transmitted back to the client application for display. A third client request based on the second set of results may be received, and corresponding financial image information may be retrieved from an image information repository and transmitted back to the client application for display.

45 Claims, 30 Drawing Sheets

USER REGISTRATION

NEW SEARCH | BILLING | MENU | HELP | LOGOFF

LOGIN

PLEASE UPDATE YOUR PERSONAL INFORMATION

TO HELP US DELIVER THE BEST SERVICE, PLEASE PROVIDE YOUR NAME AND MAIL CODE BELOW.
THIS IS A ONE-TIME PROCEDURE, BUT IF YOUR NAME OR LOCATION CHANGES, YOU CAN UPDATE THIS INFORMATION FROM THE MENU LINK

FIRST NAME: [ ]  MI: [ ]  LAST NAME: [ ]

MAIL CODE: [ ]

IF YOU ARE A NEW USER, YOU SHOULD CHANGE YOUR PASSWORD AFTER SUBMITTING THIS INFORMATION.
THE CHANGE PASSWORD SCREEN IS ACCESSED BY CLICKING MENU(ABOVE), THEN "CHANGE PASSWORD" FROM THE MENU.

[SUBMIT] [CANCEL]

ImageView 3.2- Microsoft Internet Explorer provided by ACME Banking

NEW SEARCH | BILLING | MENU | LOGOFF | HELP

🔍 SEARCH

ENTER SEARCH CRITERIA...

SEARCH BY
⊙ ACCOUNT NUMBER    ○ SEQUENCE NUMBER

SEARCH CRITERIA

| | | | |
|---|---|---|---|
| CAPTURE DATE: | 07/23/2001 | THROUGH: | |
| ACCOUNT: | | PREVIOUS: | ACCOUNTS... ▸ |
| SEQUENCE NUMBER: | | THROUGH: | |
| AMOUNT: | | THROUGH: | |
| CHECK/SERIAL NUMBER: | | THROUGH: | |

SEARCH    RESET

| | ImageView 3.2- Microsoft Internet Explorer provided by ACME Banking | | | | □|□|× |
|---|---|---|---|---|---|
| | | | NEW SEARCH | BILLING | MENU | LOGOFF | HELP | | | |
| ☑ PICK LIST | | | | | |
| | SEARCH RESULTS-99 ITEMS FOUND(DEBUG CODE: xxxxxxxxxxx) | | | | |
| 88 | ↪ xxxxxxxxx | xxxx | $7,824.00 | xxxxxxxxx | 7/16/2001 | DISK | xxxxxxxx |
| 89 | ↪ xxxxxxxxx | xxxx | $1,800.00 | xxxxxxxxx | 7/16/2001 | DISK | xxxxxxxx |
| 90 | ↪ xxxxxxxxx | xxxx | $4005.33 | xxxxxxxxx | 7/16/2001 | DISK | xxxxxxxx |
| 91 | ↪ xxxxxxxxx | xxxx | $2800.00 | xxxxxxxxx | 7/16/2001 | DISK | xxxxxxxx |
| 92 | ↪ xxxxxxxxx | xxxx | $500.00 | xxxxxxxxx | 7/16/2001 | DISK | xxxxxxxx |
| 93 | ↪ xxxxxxxxx | xxxx | $1500.00 | xxxxxxxxx | 7/16/2001 | DISK | xxxxxxxx |
| 94 | ↪ xxxxxxxxx | xxxx | $12000.00 | xxxxxxxxx | 7/16/2001 | DISK | xxxxxxxx |
| 95 | ↪ xxxxxxxxx | xxxx | $1770.00 | xxxxxxxxx | 7/16/2001 | DISK | xxxxxxxx |
| 96 | ↪ xxxxxxxxx | xxxx | $5071.03 | xxxxxxxxx | 7/16/2001 | DISK | xxxxxxxx |
| 97 | ↪ xxxxxxxxx | xxxx | $50.00 | xxxxxxxxx | 7/16/2001 | DISK | xxxxxxxx |
| 98 | ↪ xxxxxxxxx | xxxx | $100.00 | xxxxxxxxx | 7/16/2001 | DISK | xxxxxxxx |
| 99 | ↪ xxxxxxxxx | xxxx | $100.00 | xxxxxxxxx | 7/16/2001 | DISK | xxxxxxxx |
| | VIEW | SELECT ALL | SELECT NONE | REDO | BILL | SEND ITEMS... ▼ |

SEND ITEMS...
FAX
REMOTE PRINTER

NEW SEARCH | BILLING | MENU | HELP | LOGOFF

UPDATE BILLING INFORMATION

FOR WED MAY 16 14:55:16 EDT 2001    GROUP: TECH

| UPDATE | PROCESSED BY | UPDATED BY | ACCOUNT | AMOUNT | SERIAL | CHARGE/WAIVE | REASON | |
|---|---|---|---|---|---|---|---|---|
| | xxxxxxx | xxxxxxx | xxxxxxxxxxxxxxxx | $696,961.68 | xxxxx | ⊙/○ | | |
| ☐ | xxxxxxx | xxxxxxx | xxxxxxxxxxxxxxxx | $30.00 | xxxxx | ⊙/○ | 2nd REQUEST-POOR COPY ▼ | 1 |
| ☐ | xxxxxxx | xxxxxxx | xxxxxxxxxxxxxxxx | $1167.00 | xxxxx | ⊙/○ | 2nd REQUEST-POOR COPY ▼ | 1 |
| ☐ | xxxxxxx | xxxxxxx | xxxxxxxxxxxxxxxx | $210.00 | xxxxx | ⊙/○ | 2nd REQUEST-POOR COPY ▼ | 1 |
| ☐ | xxxxxxx | xxxxxxx | xxxxxxxxxxxxxxxx | $141.94 | xxxxx | ⊙/○ | 2nd REQUEST-POOR COPY ▼ | 2 |
| ☐ | xxxxxxx | xxxxxxx | xxxxxxxxxxxxxxxx | $1142.45 | xxxxx | ⊙/○ | 2nd REQUEST-POOR COPY ▼ | 2 |
| ☐ | xxxxxxx | xxxxxxx | xxxxxxxxxxxxxxxx | $7200.00 | xxxxx | ⊙/○ | 2nd REQUEST-POOR COPY ▼ | 2 |
| ☐ | xxxxxxx | xxxxxxx | xxxxxxxxxxxxxxxx | $671.45 | xxxxx | ⊙/○ | 2nd REQUEST-POOR COPY ▼ | 2 |
| ☐ | xxxxxxx | xxxxxxx | xxxxxxxxxxxxxxxx | $1607.98 | xxxxx | ⊙/○ | 2nd REQUEST-POOR COPY ▼ | 2 |

TOTAL NUMBER OF CHARGE ITEMS: 9
TOTAL NUMBER OF WAIVE ITEMS: 0

[UPDATE]  [CANCEL]

BILLING UPDATE

REPORT DEFINITIONS HAVE BEEN READ IN AGAIN.

REPORTS

[ REREAD REPORT DEFINITIONS ]

REPORT PARAMETERS:

START DATE: [ ]    END DATE: [ ]

SELECT A REPORT

| # | | ACTION |
|---|---|---|
| 1. | TOTAL IMAGE RETRIEVALS BY LOCATION & GROUP | RUN |
| 2. | AVG IMAGE RETRIEVALS BY LOCATION & GROUP | RUN |
| 3. | AVG AGE OF IMAGES RETRIEVED BY LOCATION & GROUP | RUN |
| 4. | AVG NUMBER OF REQUESTS PER LOCATION & GROUP | RUN |
| 5. | IMAGE RETRIEVAL BY SUCCESS VS FAILURE STATS | |

FIG. 23

TOTAL IMAGE RETRIEVALS BY LOCATION & GROUP

| # | LOCATION_ID | GROUP_CODE | COUNT | AVG_TIME_IN_SECONDS |
|---|---|---|---|---|
| 1. | XXXXX_XXXX | XX | 853 | 14 |
| 2. | XX | XXXX | 414 | 69 |
| 3. | XXX_XXXX | XX | 226 | 10 |
| 4. | XXXX | XXXXX | 142 | 11 |
| 5. | XXXXXXX_XXXX | XX | 136 | 9 |
| 6. | XXXXXXXXX_XXXX | XX | 117 | 12 |
| 7. | XX_XXXXXX_XXXX | XX | 99 | 20 |
| 8. | XX | XXXXXXXX | 71 | 10 |
| 9. | XXX | XXX | 45 | 10 |
| 10. | XXXX_XXXX_XXXX | XX | 35 | 10 |
| 11. | XXX_XXX_XXXX | XX | 30 | 11 |
| 12. | XXXXX_XXXX | XX | 25 | 8 |
| 13. | XXXXXX_XXXXX | XX | 13 | 14 |
| 14. | XXXXX_XXXX | XX | 12 | 13 |
| 15. | XXXXXX_XXXX | XX | 12 | 12 |
| 16. | XXXXX_XXXX | XX | 12 | 9 |
| 17. | XXXXXXX_XXXX | XX | 10 | 7 |
| 18. | XX | XXXXXXXXXXXXXX | 7 | 7 |
| 19. | XXX | XXXXXXXXXXXXXX | 6 | 3 |
| 20. | XXX_XXX | XXX | 5 | 3 |
| 21. | XXX_XXX | XXX | 4 | 3 |
| 22. | XXX | XXX | 2 | 3 |
| 23. | YYYYY | YYY | 1 | 2 |

FIG. 24

AVGV IMAGE RETRIEVALS BY LOCATION & GROUP

| # | LOCATION_ID | GROUP_CODE | AVG_COUNT |
|---|---|---|---|
| 1. | XX_XXXXXXX_XXXX | XX | 6 |
| 2. | XXXX | XXXXX | 4 |
| 3. | XX | XXXX | 3 |
| 4. | XXXXXX_XXXX | XX | 3 |
| 5. | XX | XXXXXXX | 3 |
| 6. | XXX_XXX_XXXX | XX | 3 |
| 7. | XXXX_XXXX_XXXX | XX | 3 |
| 8. | XXXXX_XXXX | XX | 2 |
| 9. | XXX_XXXX | XX | 2 |
| 10. | XXX_XXX | XXX | 2 |
| 11. | XXXXXX_XXXX | XX | 2 |
| 12. | XXXXX_XXXXX | XX | 2 |
| 13. | XXXXXX_XXXX | XX | 2 |
| 14. | XXXXXX_XXXX | XX | 2 |
| 15. | XXXX_XXXX | XX | 2 |
| 16. | XXXX_XXXX | XX | 2 |
| 17. | XXXXXXXX_XXXX | XX | 2 |
| 18. | XX | XXXXXXXXXX | 2 |
| 19. | XXX | XXX | 2 |
| 20. | YYY_YYY | YYY | 2 |

FIG. 25

AVG AGE OF IMAGES RETRIEVED BY LOCATION & GROUP

| # | LOCATION_ID | GROUP_CODE | AVG_AGE_IN_DAYS |
|---|---|---|---|
| 1. | XXX_XXX | XXX | 1 |
| 2. | XXX | XXX | 1 |
| 3. | XX_XXXXX_XXXX | XX | 3 |
| 4. | XXXXX_XXX | XX | 3 |
| 5. | XXXX_XXXX | XX | 4 |
| 6. | XXX_XXXX | XXX | 5 |
| 7. | XXX | XXX | 6 |
| 8. | XXXXXX_XXXX | XX | 6 |
| 9. | XXXXX_XXXX | XX | 6 |
| 10. | XXX_XXX | XXX | 7 |
| 11. | XXXXX_XXXX | XX | 7 |
| 12. | XX | XXXXXXXXXXX | 10 |
| 13. | XXXXX_XXXX | XX | 12 |
| 14. | XXX | XXXXXXXXXXX | 13 |
| 15. | XXX_XXX | XXX | 14 |
| 16. | XXXXXXXXX_XXXX | XX | 20 |
| 17. | XXXXX_XXXX | XX | 24 |
| 18. | XX | XXXX | 35 |
| 19. | XXX_XXX_XXX | XX | 46 |

FIG. 26

AVG NUMBER OF REQUEST PER LOCATION & GROUP

| # | LOCATION_ID | GROUP_CODE | AVG_SERVER_REQUESTS |
|---|---|---|---|
| 1. | XXXX_XXXX | | 776 |
| 2. | XXX_XXXX | XX | 497 |
| 3. | XXXXXXX_XXXX | XX | 198 |
| 4. | XXXX | XXXXX | 146 |
| 5. | XXXXX_XXXX | XX | 98 |
| 6. | XX | XXXXX | 70 |
| 7. | XXXXXXXX_XXXX | XX | 68 |
| 8. | XX | XXXX | 53 |
| 9. | XXXXXX_XXXXX | XX | 52 |
| 10. | XXXX_XXXX_XXXX | XX | 52 |
| 11. | XX_XXXXXXX_XXX | XXXXXXXXXXXX | 45 |
| 12. | XXX | XXX | 41 |
| 13. | XXX_XXX | XX | 40 |
| 14. | XXXXX_XXX | XXX | 37 |
| 15. | XXXXXX_XXXX | XXX | 36 |
| 16. | XXX_XXX | XX | 35 |
| 17. | XXX | XX | 34 |
| 18. | XXX_XXX_XXXX | XX | 27 |
| 19. | XXXXX_XXXX | XX | 22 |
| 20. | | | 19 |

FIG. 27

SEARCH RESULTS - 19 ITEMS FOUND

| | Sel | SEQUENCE | CHECK SERIAL | D/C | AMOUNT | ACCOUNT | CAPTURE DATE | LOCAFOR | Doc/STATE | ABA | MORE | |
|---|---|---|---|---|---|---|---|---|---|---|---|---|
| 8 | ☐ | 1111111119 | XXXX | D | $892.50 | XXXXXXXX | 08/26/2003 | DISK | O-MO | XXXXXXXX | | 🔍 |
| 9 | ☐ | 1111111114 | XXXX | D | $85.60 | XXXXXXXX | 08/27/2003 | DISK | O-MO | XXXXXXXX | | 🔍 |
| 10 | ☐ | 1111111113 | XXXX | D | $130.00 | XXXXXXXX | 08/27/2003 | DISK | O-MO | XXXXXXXX | | 🔍 |
| 11 | ☐ | 1111111111 | XXXX | D | $240.04 | XXXXXXXX | 09/04/2003 | DISK | O-MO | XXXXXXXX | | 🔍 |
| 12 | ☐ | 1111111119 | XXXX | D | $40.00 | XXXXXXXX | 09/17/2003 | DISK | O-MO | XXXXXXXX | | 🔍 |
| 13 | ☐ | 1111111114 | XXXX | D | $1,112.30 | XXXXXXXX | 09/18/2003 | DISK | O-MO | XXXXXXXX | | 🔍 |
| 14 | ☐ | 1111111119 | XXXX | D | $600.00 | XXXXXXXX | 10/01/2003 | DISK | O-MO | XXXXXXXX | | 🔍 |
| 15 | ☐ | 1111111115 | XXXXXXXXX | C | $73.26 | XXXXXXXX | 09/19/2003 | DISK | O-MO | XXXXXXXX | + | 🔍 |
| 16 | ☐ | 1111111119 | XXXXXXXXX | C | $268.80 | XXXXXXXX | 10/01/2003 | DISK | O-MO | XXXXXXXX | + | 🔍 |
| 17 | ☐ | 1111111115 | XXXXXXXXX | C | $214.40 | XXXXXXXX | 10/01/2003 | DISK | O-MO | XXXXXXXX | + | 🔍 |
| 18 | ☐ | 1111111113 | XXXXXXXXX | C | $40.00 | XXXXXXXX | 09/16/2003 | DISK | O-MO | XXXXXXXX | + | 🔍 |
| 19 | ☐ | 1111111111 | XXXXXXXXX | C | $500.00 | XXXXXXXX | 09/16/2003 | DISK | O-MO | XXXXXXXX | + | 🔍 |

SEARCH RESULTS - 2 ITEMS FOUND

| # | Sel | SEQUENCE | CHECK SERIAL | D/C | AMOUNT | ACCOUNT | CAPTURE DATE | LOCAFOR | Doc/STATE | ABA | MORE |
|---|---|---|---|---|---|---|---|---|---|---|---|
| 1 | ☐ | 1111111119 | XXXXXXXXX | C | $268.80 | XXXXXXXX | 10/01/2003 | DISK | O-MO | XXXXXXXX | + 🔍 |
| 2 | ☐ | 1111111114 | XXXXXXXXX | | $268.80 | XXXXXXXXXXXX | 10/01/2003 | DISK | T | XXXXXXXX | 🔍 |

*FIG. 30*

IMAGE AND DATA PROCESSING SYSTEM

This application is a continuation-in-part of U.S. patent application Ser. No. 10/284,607, filed Oct. 31, 2002, now abandoned the contents of which are incorporated herein by reference, which claims the benefit of provisional application No. 60/369,880, filed Apr. 5, 2002, the contents of which are incorporated herein by reference.

BACKGROUND

1. Field

This invention relates to image processing.

2. Description of Related Art

Banking and other industries are undergoing a revolution in processing traditionally paper and other hard copy documents. For example, the capture of images of various transactional documents in the banking industry provides banking institutions with an opportunity to streamline business processes and improve efficiencies. In addition, the ability to view images of these captured documents offers a valuable service to all end-users, including bank institution customers and bank institution personnel. For example, access to images is useful for fraud prevention and integration into business workflows.

In many financial institutions, electronic images and other associated image information of a large number of documents, especially checks, have been created. This image information is available for electronic access and capable of being transmitted and processed by electronic means such as computers. However, in many cases, disparate image information repositories and, associated systems have been provided for maintaining such image information. These disparate systems are not integrated, and cannot be accessed by a variety of means. The result is that obtaining access to image information can often be, among other things, difficult, labor-intensive, time-consuming and error-prone. For example, the various systems are often incompatible and require specialized software for access to the image information. Further, determining in which one or more repositories desired image information is located can involve labor-intensive and time-consuming searching.

Accordingly, there is a need for flexible and scalable support of a wide variety of applications to access image information using, for example, components that are well-known and proven technologies. Further, there is a need for image processing systems that offer rapid access, scalability, and reliability. Further, there is a need to integrate various disparate systems and databases, and allow access thereto by a variety of means and devices. Accordingly, it would be advantageous to provide improved image information processing methods and systems.

BRIEF DESCRIPTION OF THE DRAWINGS

Utility of the embodiments of the invention will be readily appreciated and understood from consideration of the following detailed description of the embodiments of this invention, when taken with the accompanying drawings, in which same numbered elements are identical or similar and:

FIG. 7 illustrates an implementation of a user registration screen, in accordance with at least one embodiment of the invention;

FIG. 8 illustrates an implementation of a search screen in accordance with at least one embodiment of the invention;

FIG. 10 illustrates an implementation of a pick list screen in accordance with at least one embodiment of the invention;

FIG. 14 illustrates an implementation of an add billing screen in accordance with at least one embodiment of the invention;

FIG. 15 illustrates an implementation of a billing update search screen in accordance with at least one embodiment of the invention;

FIG. 16 illustrates an implementation of an update billing information screen in accordance with at least one embodiment of the invention;

FIG. 22 illustrates an implementation of an update user status configuration screen in accordance with at least one embodiment of the invention;

FIG. 23 illustrates an implementation of a reports menu screen in accordance with at least one embodiment of the invention;

FIG. 24 illustrates an implementation of a Total Image Retrievals by Location & Group report screen in accordance with at least one embodiment of the invention;

FIG. 25 illustrates an implementation of an Average Image Retrievals by Location & Group report screen in accordance with at least one embodiment of the invention;

FIG. 26 illustrates an implementation of an Average Age of Images Retrieved by Location & Group report screen in accordance with at least one embodiment of the invention;

FIG. 27 illustrates an implementation of an Average Number of Requests per Location & Group report screen in accordance with at least one embodiment of the invention;

FIG. 30 illustrates an implementation of a pick list screen in accordance with at least one embodiment of the invention.

DETAILED DESCRIPTION

Figure 1:
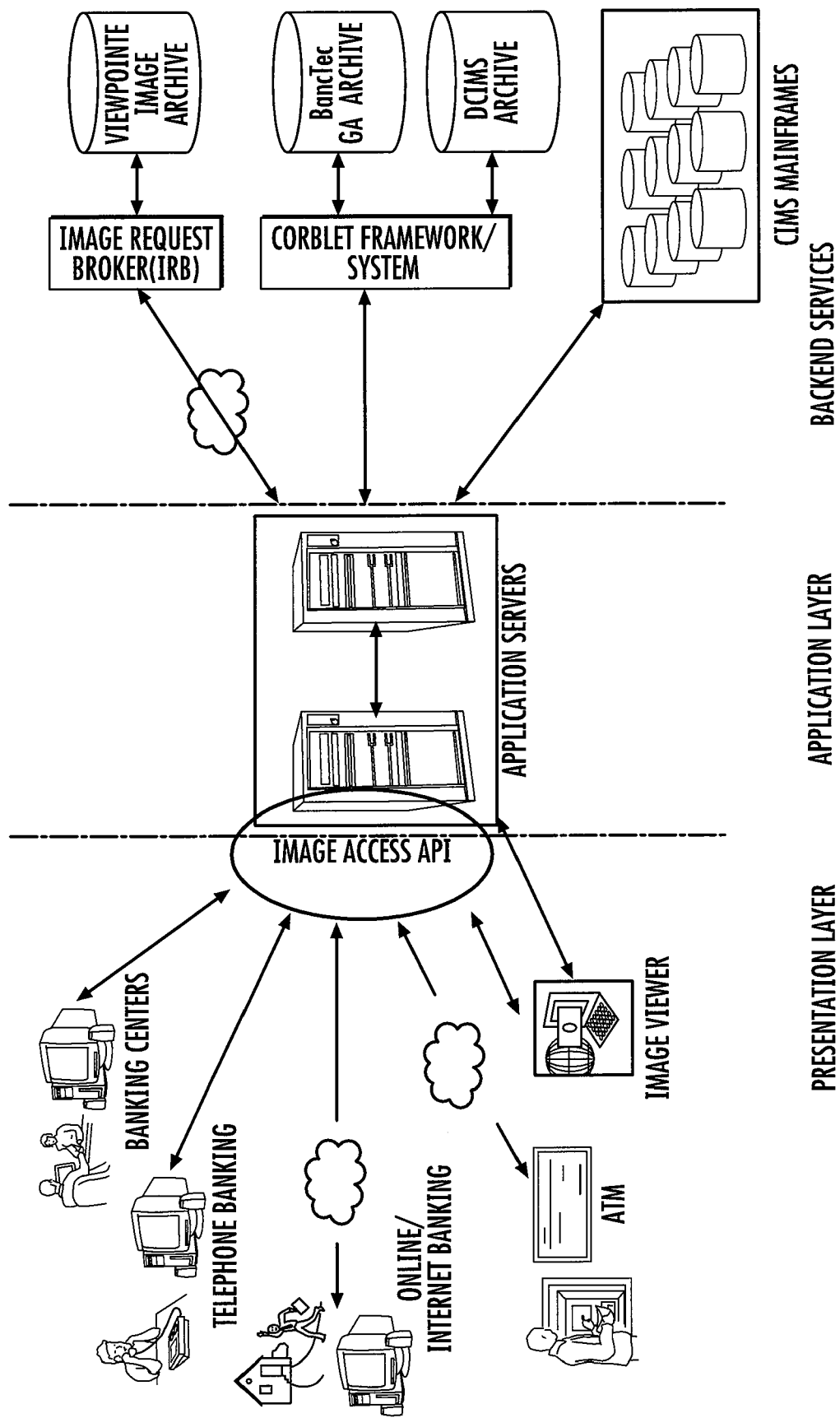
FIG. 1 illustrates a networked environment in which at least one embodiment according to the present invention may be implemented.

In one embodiment, the present invention for the first time provides integrated access to financial image information from disparate incompatible computer systems and data repositories, which may include images of checks, bills, invoices, account statements, trust documents, wills, share certificates, loan, documents, powers of attorney, mortgage documents, insurance policies, signature cards, fingerprints, retina scans, customer photos, human resource documents, UCC financing statements, and other financial documents.

In one embodiment, access to the images can be provided to a user through a variety of means, including a personal computer, a telephone with a display, an ATM machine, an Image Viewer (described herein), a PDA, a palmtop computer, a Web-enabled mobile phone, a laptop computer, or any other mobile computing device.

Embodiments of the invention provide a system and method for image processing including providing access to image information, such as document images and image indices, and providing various functions pertaining to the image information. In at least one embodiment, the system and method facilitates access to financial document images in a banking environment. The system and method can be used by, among others, banking institution personnel to view and update financial document image information. The system and method can be used to perform image processing, from disparate image information repositories of any number of kinds of image information, including images of checks, trust documents, bills, invoices, account statements, wills, share certificates, loan documents, powers of attorney, mortgage documents, insurance policies, signature cards, fingerprints, customer photos, human resource documents, UCC financing statements, and retina scans. Those skilled in the art will recognize that many variations are possible in which the system and method for image processing may be configured to provide image processing functionality within the scope of the present invention. The system and method of the present invention may be applied to any industry including without limitation the banking, insurance, legal, and financial industries.

An image access server system provides a central point of contact for a client to request documents from any image information repository whether located within an organization or located elsewhere. Using the image access server system, clients are able to request images from disparate image information repositories, such as databases, archives and folders, without requiring specific knowledge of the particular image information repository or repositories where the image is available or the repository" location and/or repository applications needed to access the image. The image access server system is able to compile image request results from any (or all) relevant repositories into, a single response to the client.

To support client applications, which act as proxies for users, the image access server system includes an exposed application programming interface (API), the image access API, that provides an object through which image information requests can be processed. For example, the image access API provides universal access to image information repositories without regard to location of the image information repositories, provides an object-oriented interface (e.g. an interface coded in the Java programming language designed by Sun Microsystems, Inc.) which can be easily integrated into client applications, provides an interface which insulates client applications from implementation specific requirements of the image access server system and the image information repositories, and provides a reporting mechanism which enables client applications to retrieve image information access volumes and average response times.

Using the image access server system in a banking environment, client applications, such as online banking applications, automated teller machines (ATM) and banking center computers, can integrate images stored in image information repositories into their workflows without the need to know exactly where image information resides or specifics regarding accessing the image information.

According to at least one embodiment, a particular type of client application is an image viewer. The image viewer is a Web-based application and framework that provides image viewing and input capability to end-users. In at least, one embodiment, the image viewer client application connects to the image access server system via the image access API.

Image Access Environment

FIG. 1 illustrates a networked environment in which at least one embodiment according to the present invention may be implemented. An image access server system in the networked environment processes and transmits image information. The network environment comprises one or more clients that may send image information requests and/or updates to the image access server system via a client communications interface, and that may receive image information from the image access server system using the client communications interface. The networked environment further comprises one or more image information repositories that may receive image information queries and/or updates from the image access server system via a repository communications interface, and that may transmit image information responses to the image access server system queries and/or updates using the repository communications interface. In at least one embodiment, the image information repositories in the networked environment may comprise one or more image information databases, managed or housed by, for example, a database server or mainframe, that may receive image information queries from the image access server system via the repository communications interface, and that may transmit image information responses to the image access server system queries using the repository communications interface. Such image information databases can include traditional relational databases in a financial institution such as, but not limited to, a brokerage firm or bank, that store typical image information of the institution, the institutions customers, etc. Although shown in FIG. 1 as comprising separate physical computing platforms, the clients, repositories, image access server system, etc. may also be implemented in the form of application software instructions executing on a single computing platform as well as across multiple computing platforms. Further, although as shown as repositories, the image information repositories may be other systems that provide or access image information.

The client(s) may be, for example, a personal computer provided with the capability to receive and display user interfaces included on, for example, HyperText Markup Language (HTML) formatted or Extensible Markup Language (XML) formatted pages provided in accordance with, for example, the HyperText Transport Protocol (HTTP). The client(s) may also have the capability to transmit and receive electronic mail messages in accordance with the Simple Mail Transport Protocol (SMTP). The client(s) may also be any personal communication device such as, but not limited to, a personal digital assistant or a Web-enabled wireless telephone. The client(s) can be devices including specially developed software or employ standard configurable software such as a browser application that can operate with HTML pages, JavaScript™ and/or ActiveX™ code, and Java applets, where required.

The client types may include a PC, a display telephone, an ATM machine, an Image Viewer (described herein), a PDA, a palmtop computer, a Web-enabled mobile phone, a laptop computer, or any other mobile computing device.

The communications interfaces may include any type of communications network and may include communications connections within and/or outside an organization. In at least one embodiment, the communications network may be a public network such as the Internet. Communications systems used to implement the communications networks may include, but are not limited to, a telephone landline based modem network, a wireless network such as a cellular digital packet data (CDPD) network or a wireless local area network (LAN). Additionally, the communications network may be a private network in which information transmitted over the communications network is prevented from being readily accessible by systems or persons other than those associated with or permitted by the image access server system. The communications network may use encryption such that data transmitted on the communications network is encrypted using, for example, any commercially available or proprietary encryption scheme such as, but not limited to, 56-bit Data Encryption Standard (DES), 128-bit triple-DES, 128-bit RC4 and IDEA. In accordance with at least one embodiment of the invention, the image access server system uses HTTP connections over its communications interfaces, which connections may conform to the Secure Socket Layer (SSL) protocol in order to provide for secure information transport for image information.

The repositories may include one or more relational databases and database management system (DBMS) software, application such as Oracle 8, provided by Oracle Corporation, for storage and retrieval of image information in accordance with the Structured Query Language (SQL) database format from the database. Such database management software may execute one or more stored procedures or scripts of SQL instructions operative to store or retrieve particular items of image information arranged and formatted in accordance with a set of formatting instructions. Such stored procedures are typically stored or otherwise associated with the databases. For example, the database management software may execute one or more SQL stored procedures in response to a request from the image access server system to retrieve particular items of image information in a format suitable for transmission to and display by the client(s) using a browser software application such as, for example, the Internet Explorer™ application provided by Microsoft Corporation. The databases (and their database management software) may communicate with the image access server system in accordance with the Open Database Connectivity (ODBC) standard developed by Microsoft Corporation. Certain items of image information may be stored as encrypted information for purposes of maintaining the security of these items.

The repositories may also include one or more image information archives and an image request broker software application and/or Corblet framework/system for storage and retrieval of image information in accordance with an image archive format for the archive. Such image request broker software and/or Corblet framework/system may execute one or more procedures operative to facilitate storage or retrieval of items of image information. For example, the image request broker may execute one or more procedures in response to a request from the image access server system to retrieve particular items of image information in a format suitable for transmission to and display by the client(s) using a browser software application such as, for example, the Microsoft Internet Explorer. In at least one embodiment, the image request broker may be the Image Request Broker software licensed by Check Solutions, a subsidiary of Carreker Corporation. The Corblet framework/system, for example, may facilitate the establishment of objects used to retrieve particular items of image information from the image, information archive. The image information archive (and its image request broker software and/or Corblet framework/system) may communicate with the image access server system in accordance with a proprietary or open communications protocol and/or object architecture. For example, in the case of the Corblet framework/system, the Corblet framework/system is configured in accordance with the CORBA™ technology specified by the Object Management Group.

The repositories may further include one or more mainframe databases and item server software for storage and retrieval of image information in accordance with a mainframe database format for the mainframe database. Such item server software may execute one or more procedures operative to store or retrieve particular items of image information arranged and formatted in accordance with a set of formatting instructions. For example, the item server may execute one or more procedures in response to a request from the image access server system to retrieve particular items of image information, via various other mainframe software, in a format suitable for transmission to and display by the client(s) using a browser software application such as, for example, the Internet Explorer™ application provided by Microsoft Corporation. The mainframe database (and its item server software) may communicate with the image access server system in accordance with a proprietary or open communications protocol.

Although not shown in FIG. 1, a networked environment for use in conjunction with, including or implementing the image access server system may include multiple load-balanced servers, load balancers, back-up sites and facilities for restoration of information. The networked environment may further include one or more firewalls or proxies to facilitate, among other things, the security and integrity of the network. The networked environment may further include one or more of the following: a SSL accelerator to support secure networked communications, caching servers for local higher-speed serving of recently or frequently requested HTML or XML pages, one or more application server clusters, one or more Web server clusters, one or more database server clusters, persistent storage, and switching devices. For example, the server clusters may be used to implement the image access server system in whole or in part and the persistent storage used to hold image information. The network environment depicted in FIG. 1 may have further interfaces (not shown) to one or more other networks.

Figure 2:
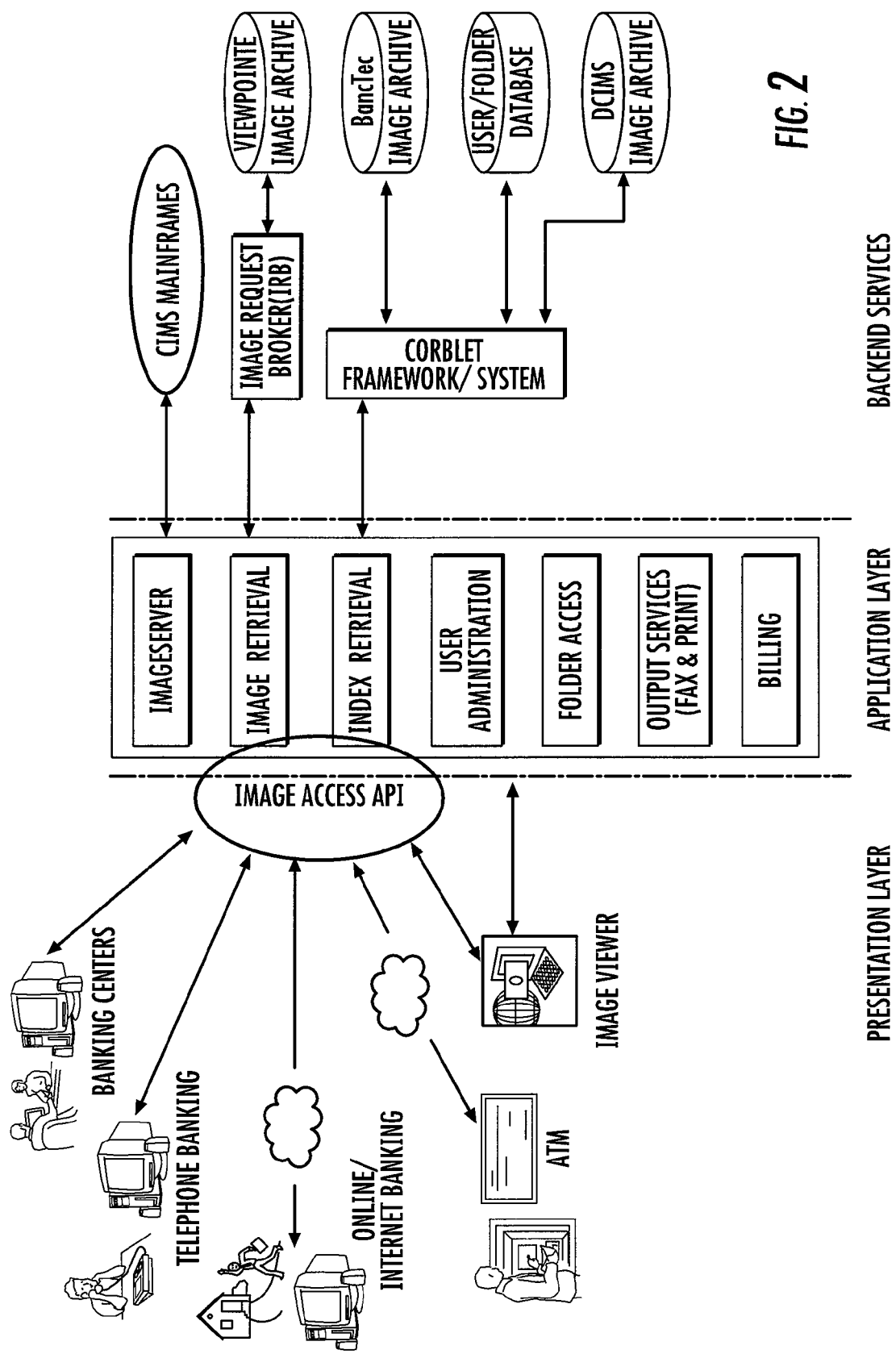
FIG. 2 illustrates a functional block diagram of an image access server system and the networked environment of at least one embodiment according to the present invention.

FIG. 2 illustrates a functional block diagram of an image access server system and the networked environment of at least one embodiment according to the present invention. The image access server system comprises one or more servers that may receive image information requests or updates from one or more clients via the client communications interface, and that may transmit image information to the client(s) using the client communications interface. The server(s) may transmit image information queries, or updates to the image information repository(ies) using the repository, communications interface, and that may receive image information responses from the image information repository(ies) via the repository communications interface.

In at least one embodiment, the server(s) are one or more computers having software to provide a platform for the functions of the image access server system. In this respect and as described in more detail below, the server(s) may include software to interact with the client(s) via the client communications interface and may also include software to interact with the image information repository(ies) via the repository communications interface. As will be apparent to those skilled in the art, the server(s) may also interact with other systems and platforms through the above-described or other communications interfaces and have appropriate software therefor.

In at least one embodiment, the server may be a Sun Enterprise™ E450 server computer, provided by Sun Microsystems, Inc. of Palo Alto, Calif., configured to execute software instructions implementing the functions described herein. The server may include operating system instructions operable to control basic operation and control of components of the server. In at least one embodiment, the operating system instructions may include the Sun Solaris™ 8 UNIX-based operating system configured for use with the Sun Enterprise™ E450 server.

The server(s) may include application server software such as the Borland™ Enterprise Server software product, provided by the Inprise Corporation, for processing and transmission, of image information, including as part of HTML or XML pages. Further, the server(s) may include database access software to communicate with databases included in the repositories. The server(s) may also include software programmed according to the Java™ programming language developed by Sun Microsystems, Inc., the JavaScript™ programming language offered by Sun Microsystems, Inc. and/or the Enterprise Java Beans technology specification developed by Sun Microsystems, Inc., to provide image access functionality. As will be apparent to those skilled in the art, other programming languages may be used for implementation of the image access server system as described herein. Similarly, the server(s) may also include Web server and database server software.

As will be apparent to those skilled in the art, the one or more servers of the image access server system may each provide different functionality of the image access server system. So, for example, the one or more servers of the image access server system may include a database server for managing database interaction, an application server for providing image access functionality, and a Web server for managing client interaction. Similarly, all functionality of the image access server system may be implemented in the form of software executing on one server. Further, portions of the image access server system may also be provided by other software, servers or systems in the networked environment. Also, the image access server system may include all or parts of the networked environment. Accordingly, the image access server system may be implemented in any number of configurations.

The image access server system may be implemented using an existing networked environment developed to facilitate the exchange of image information over networks and employ widely used, reliable components such as off-the-shelf server computers, server software and database software. The image access server system may use, for example, database software to store some or all information including persistence and database tables. The technology used may be chosen to provide flexibility, modularity, reliability, scalability, speed of execution and data security.

The image access server system may also comprise one or more databases to store image access server system information. Such image access server system information can include local data generated during the operation of the image access server system, configuration parameters, copies of image information, etc. Such image access server system information may also comprise software code for the image access server system.

The image access server system includes application executable instructions for implementing one or more aspects of the image access server system functionality, as more fully discussed below. The image access server system may also be useful for hosting software application programs implementing the client(s). For example, the server may provide one or more applets to the client, the applets configured to run on a browser application executing on the client and to provide image access server system functionality on the client. For example, an applet may be provided in association with a screen of the image access server system displayed on the client to interact with the user of the client.

The application executable instructions may include one or more application program interfaces (APIs) such as the image access API discussed in more detail below. As discussed below, the image access server system software programs may provide the functionality for the methods exposed by the image access API. The image access API is used to facilitate the development of client applications to perform image information storage or retrieval operations against image information repositories via the image access server system. As described below, the image access API provides a single contact for client applications to access the image access server system functionality to store and retrieve image information from disparate image information repositories.

The application executable instructions may include one or more components for providing the image access functionality of the image access server system as described in more detail below. The server(s) may receive via the client communication interface a request for particular image information, (and receive associated user-entered data from a client (such as a browser or electronic access device)) or a store command for storing particular image information (and receive associated user-entered data from a client (such as a browser or electronic access device)). In at least one embodiment, the request may be for image information formatted in a screen and the user-entered data includes data used to facilitate the retrieval of the requested image information. Such a request may be a hyperlinked request from a screen, comprising one or more interactive HTML or XML pages in accordance with the JavaServer Pages™ (JSP) format developed by Sun Microsystems, Inc., displayed on the client and the request transmitted according to the HTTP protocol. In at least one embodiment, the store command may be for a store operation performed in relation to user entered data. Such a store command can be a hyperlinked command from a screen, comprising one or more interactive HTML or XML pages in accordance with the JavaServer Pages™ (JSP) format developed by Sun Microsystems, Inc., displayed on the client and the store command transmitted according to the HTTP protocol. The user-entered data may be data provided by a user through a screen, comprising one or more interactive HTML or XML pages in the JSP format, displayed on the client. A page generated using JavaServer Pages technology is a text-based document that contains two types of text: static template data, which can be expressed in any text-based format such as HTML or XML and JavaServer Pages elements, which construct dynamic content. Alternatively, such a request or store command can be a hyperlinked request or store command from a screen, comprising one or more interactive HTML or XML pages in accordance with the Active Server Pages™ (ASP) format developed by Microsoft Corporation, displayed on the client and the request or store command transmitted according to the HTTP protocol. In that case, the user-entered data may be data provided by a user through a screen, comprising one or more interactive HTML or XML pages in the ASP format, displayed on the client.

In at least one embodiment the request or store command is received and processed by the server through the image access API. The image access API is triggered to process the request or the store command (and the user-entered data, if any). In at least one embodiment, the image access API is programmed in the Java programming language. In at least one embodiment, the call of a method against the image access API causes the instantiation of one or more Enterprise Java Beans programs or beans in the server to perform the functionality of the called methods.

Referring to FIG. 2, an index retrieval bean provides index image information request functionality as described in more detail below with respect to the image access API. The bean initiates a connection with one or more image information repositories or repository software over the repository communications interface. The bean facilitates storage of data processed, retrieved and/or created by the bean. For example, the data may be stored in an instantiated data bean class written in the Java programming language. The bean further invokes the retrieval of the requested image information from the image information repository(ies). For example, the bean may execute a stored procedure associated with a particular image information repository using user-entered data. Different stored procedures may be provided to retrieve different types of image information and the bean would choose the particular stored procedure(s) for execution based upon the request. The bean may also, for example, interact with repository software associated with a particular repository, such as the image request broker or the Corblet framework/system, to retrieve the requested image information. The bean may further pass user-entered data and retrieved image information to a screen generator (not shown) for use in display, as described in more detail below. In at least one embodiment, the screen generator is a JSP application. The bean may optionally transmit the retrieved image information to the client(s) for processing by the client application(s).

The screen generator facilitates display of all or some of the user-entered data and/or retrieved image information by generating and transmitting a screen, comprising, for example, one or more interactive HTML or XML pages, to the client via the client communications interface. In at least one embodiment, a screen may be generated by a JSP application and comprises one or more interactive HTML or XML pages including and/or using information about the request, store command, the user-entered data, the retrieved image information and/or other results, if any, transmitted to the requesting client in accordance with JSP formatting and the HTTP protocol. Alternatively, the screen may be generated and transmitted in, accordance with the ASP standard developed by Microsoft Corporation.

An image retrieval bean provides image request functionality as described in more detail below with respect to the image access API. The bean initiates a connection with one or more image information repositories or repository software over the repository communications interface. The bean facilitates storage of data processed, retrieved and/or created by the bean. For example, the data may be stored in an instantiated data bean class written in the Java programming language. The bean further invokes the retrieval of one or more requested images from the image information repository(ies). For example, the bean may execute a stored procedure associated with a particular image information repository using user-entered data or system data identifying the image (s). Different stored procedures may be provided to retrieve different types of images and the bean would choose the particular stored procedure(s) for execution based upon the request. The bean may also, for example, interact with repository software associated with a particular repository, such as the image request broker or the Corblet framework/system, to retrieve one or more requested images. The bean may further pass user-entered data and the retrieved image(s) to a screen generator (not shown) for use in display, as described in more detail above. The bean may optionally transmit the retrieved image(s) to the client(s) for processing by the client application(s).

A user administration bean provides user administration functionality for the image access server system as described in more detail below with respect to the image viewer. The bean initiates a connection with an image access server system database comprising user information. The bean facilitates retrieval and storage of user administration information such as authentication of clients and users, updating of user information, etc. In at least one embodiment, the bean facilitates validation of particular Users of client applications and validation of classes of client applications. To facilitate storage and retrieval of user administration information, the bean may, for example, execute one or more stored procedures against the image access server system database to perform user authentication or updating of user information. Different stored procedures may be provided to perform different user administration functions. The bean may also, for example, interact with other user administration systems, where required and/or implemented. The bean may further pass user-entered data and retrieved user administration information to a screen generator (not shown) for use in display, as described in more detail above. The bean may optionally transmit the user administration information to the client(s) for processing by the client application(s).

A folder access bean provides folder functionality for the image access server system. The bean maintains folders for image information search requests and results. The bean, for example, initiates a connection with an image access server system database comprising folder information. The bean facilitates retrieval and storage of image information search requests and results into the database so that a user can organize such requests and results into folders for later review. To facilitate storage and retrieval of image information requests and results into and from folders, the bean may, for example, execute one or more stored procedures against the image access server system database to, perform the folder functionality. Different stored procedures may be provided to perform different folder functions. The bean may also, for example, interact with other storage systems, where required and/or implemented. The bean may further pass user-entered data and retrieved folder information to a screen generator (not shown) for use in display, as described in more detail above. The bean may optionally transmit the folder information to the client(s) for processing by the client application(s).

An output services bean provides client applications with remote printing and fax capabilities with respect to image information as described in more detail below with respect to the image viewer. The bean initiates a connection with one or more remote printers and/or one or more fax servers. The bean facilitates sending retrieved image information to the remote printers for printing or the fax servers for faxing. The bean may further pass user-entered data and printing and/or fax results to a screen generator (not shown) for use in display, as described in more detail above. The bean may optionally transmit the user-entered data and printing and/or fax results to the client(s) for processing by the client application(s). Optionally, the output services bean may be configured to provide client application with e-mail capabilities with respect to the image information. In such a case, the bean initiates a connection with one or more e-mail applications or provides e-mail capability on its own.

A billing bean provides client applications with billing, capabilities with respect to image information as described in more detail below with respect to the image viewer. The bean initiates a connection with one or more billing applications. The bean facilitates sending user-entered data and retrieved image information to the billing applications for billing to accounts. The bean may further pass user-entered data and billing results to a screen generator (not shown) for use in display, as described in more detail above. The bean may optionally transmit the user-entered data and billing results to the client(s) for processing by the client application(s).

An image server bean provides image information request functionality with respect to a particular mainframe database known as CIMS, a database technology licensed by Check Solutions. The bean initiates a connection via Item Client software (see, e.g., FIG. 3) with one or more Item Servers associated with CIMS databases, software licensed by Check Solutions. The bean facilitates storage of data processed, retrieved and/or created by the bean. For example, the data may be stored in an instantiated data bean class written in the Java programming language. The bean further invokes the retrieval of one or more requested images from the CIMS databases via the Item Client and Item Server software. The bean may further pass user-entered data and the retrieved image(s) to a screen generator (not shown) for use in display, as described in more detail above. The bean may optionally transmit the retrieved image(s) to the client(s) for processing by the client application(s).

As will be apparent to those skilled in the art, the image server, image retrieval bean, index retrieval bean, user administration bean, folder access bean, output services bean and the billing bean may be implemented as single software and/or hardware application or divided into any number of separate software and/or hardware applications or components. Further, as will be apparent to those skilled in the art, the various beans may be implemented in other technologies and languages than the Enterprise Java Beans technology.

Figure 3:
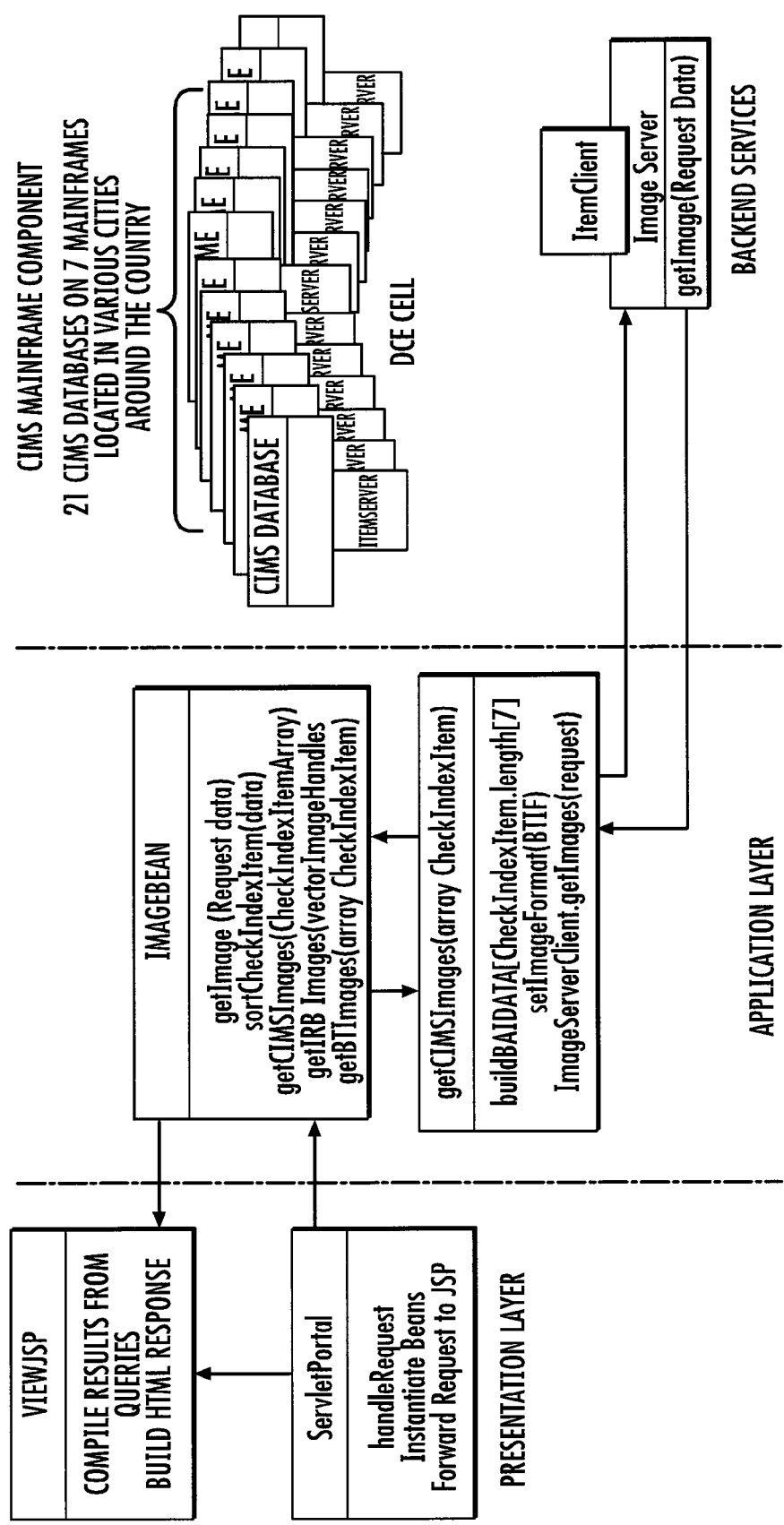
FIG. 3 illustrates a functional block diagram of the software and top-level data flow for accessing a mainframe database of at least one embodiment according to the present invention.

Referring to FIG. 3, a functional block diagram of the software and top-level data flow for accessing a mainframe database of at least one embodiment according to the present invention is depicted. FIG. 3 depicts three layers: a presentation layer for presenting image information request and results screens, an application layer for processing image information requests and results, and a backend services layer for storing and providing image information.

The presentation layer comprises, several software components to provide for the processing and display of screens for requesting image information and presenting image information request results. A ServletPortal component provides processing and display of screens for requesting image information. In at least one embodiment, the ServletPortal component is a servlet programmed in the Java programming language. The ServletPortal component manages the display of an image information request screen such as discussed below in relation to the image viewer. In at least one embodiment, it provides information to a ViewJSP component as described in more detail below to generate an image information request screen. Further, the ServletPortal component processes image information request and store commands and associated user-entered data to initiate the retrieval of image information. The ServletPortal component, for example, instantiates relevant image access server system beans to retrieve image information according to, typically, the user-entered data.

A ViewJSP component facilitates display of all or some of the user-entered data and/or retrieved image information by generating and transmitting a screen, comprising, for example, one or more interactive HTML or XML pages, to the client. In at least one embodiment, a screen may be generated by a JSP application and comprises one or more interactive HTML or XML pages including and/or using information about the image information request, the user-entered data, the retrieved image information and/or other results, if any, transmitted to the requesting client in accordance with JSP formatting and the HTTP protocol. The ViewJSP component accepts data regarding image information requests from the ServletPortal component and accepts image information request results from an ImageBean component described in more detail below.

An ImageBean component provides image request functionality as described in more detail below with respect to the image access API. The ImageBean component initiates a connection with one or more image information repositories or repository software. The ImageBean further invokes the retrieval of one or more requested images from the image information repository(ies). So, for example, depending on the ImageBean component method called the ImageBean component retrieves the requested image(s) from the one or more image information repositories or repository software to which it has access according to the information, provided by the ServletPortal component. Referring to FIG. 3, several ImageBean component methods are depicted. In the example of FIG. 3, the getCIMSImages method was invoked to retrieve one or more images from a mainframe database (CIMS database). The getCIMSImages method takes an array of CheckIndexItem parameter values. The array of CheckIndexItem values indicate the particular image(s) requested from the CIMS database. As seen in FIG. 3, the invocation of the getCIMSImages causes the invocation of several methods against another component, the ImageServer component, as discussed in more detail below in regards to that component. As will be apparent to those skilled in the art, other methods may be provided for other image information repositories or repository software. Once the ImageBean component receives results (whether image information or no results), the ImageBean component communicates the results to the ViewJSP component for use in display, as described in more detail above.

An ImageServer component provides image information request functionality with respect to a particular mainframe database known as CIMS. The ImageServer component initiates a connection via Item Client software (see, e.g., FIG. 3) with one or more Item Server programs associated with CIMS databases. Depending on the methods invoked by the ImageBean component, the ImageServer component invokes the retrieval of one or more requested images from the CIMS databases via the Item Client, and Item Server software. Once the ImageServer component receives results (whether requested image(s) or no results), the ImageServer component communicates the results to the ImageServer component, which then further communicates the results for use in display, as described in more detail above.

As will be apparent to those skilled in the art, these various components may be implemented as single software and/or hardware application or divided into any number of separate software and/or hardware applications or components.

Figure 4:
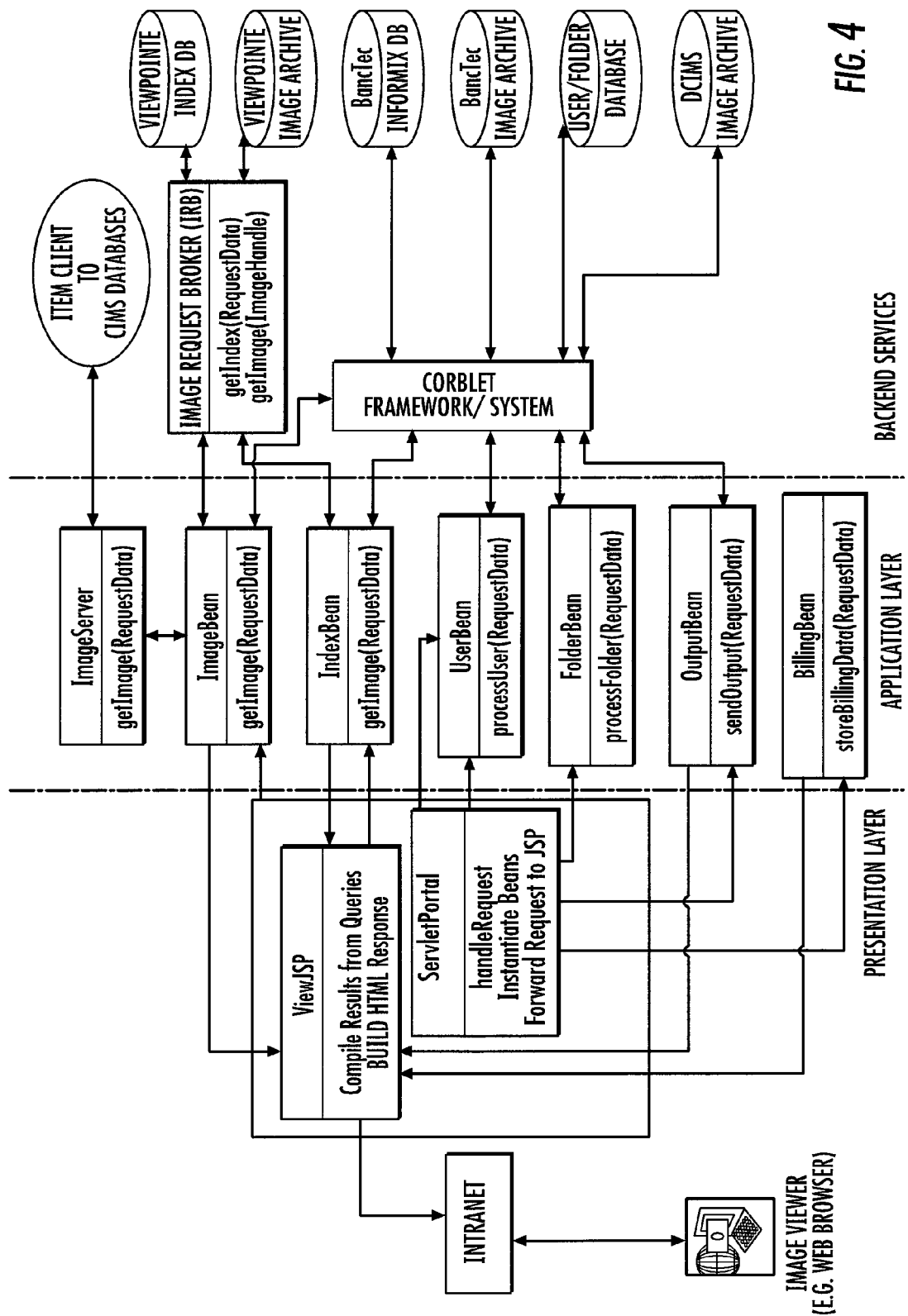
FIG. 4 illustrates a functional block diagram of the software and top-level data flow of an image viewer accessing image information repositories via an image access server system of least one embodiment according to the present invention.

Furthermore, as will be apparent to those skilled in the art, the interactions and processes described above may be applied to the other types of beans described above to provide the functionality described herein, including the functionality of the image access API and image viewer. For example, FIG. 4 illustrates a functional block diagram of the software and top-level data flow of an image viewer accessing image information repositories via an image access server system of least one embodiment according to the present invention. In FIG. 4, the various process and data flows are shown for the various beans described above with the primary method of each bean depicted.

Figure 5:
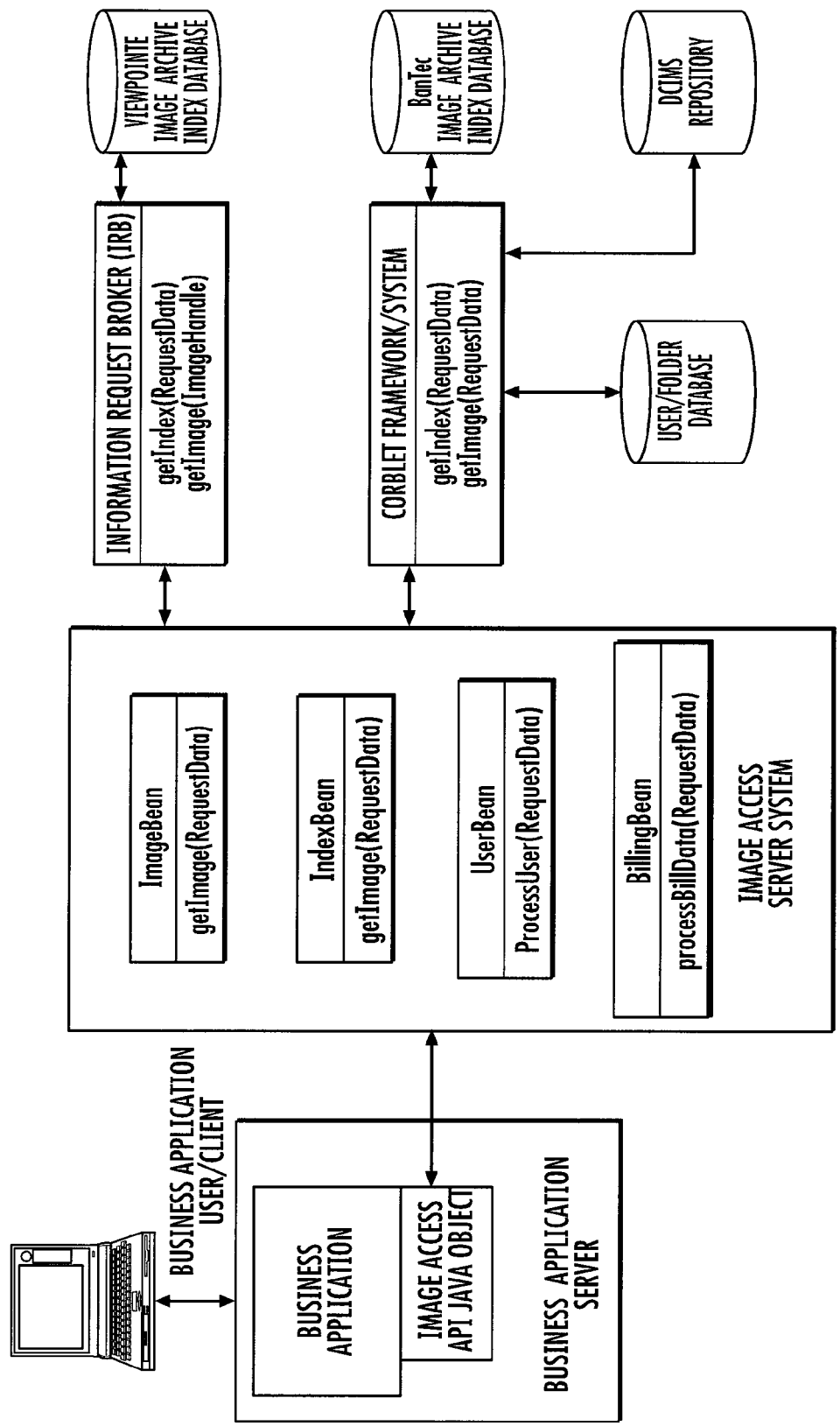
FIG. 5 illustrates a functional block diagram of the software structure and top-level data flow of a business application accessing image information repositories via an image access server system of least one embodiment according to the present invention.

Referring to FIG. 5, a functional block diagram of the software structure and top-level data flow of a business application image accessing image information repositories via an image access server system of least one embodiment according to the present invention. A business application can easily take advantage of image information available through the image access server system by accessing the image access API of the image access server system. Referring to FIG. 5, a business application user/client can access the business application, software on the business application server/computer. The business application is implemented to access the image access API via instantiation of an image access API Java object that communicates with the image access server system. The image access server system comprises the implementation of the image access API. As discussed above, and generally depicted in FIG. 5, the image access API maybe implemented as one or more Enterprise Java Beans components On the image access server system to provide the image access server system functionality. Appropriate calls on image access API methods causes the execution of the relevant components on the image access server system. Such components can include an ImageBean component for retrieving images, an IndexBean component for retrieving image index information, a UserBean component for updating user administrative information, and BillingBean component for providing billing with respect to image information retrieval.

The image access server system components, in turn, interact with one or more image information repositories or repository software to store or retrieve image information. For example, one or more of the image access server system components may interact with Information Request Broker software to retrieve or store image information on the ViewPointe image archive and index database provided ViewPointe Archive Services. Similarly, the image access server system components may interact with a Corblet framework/system to retrieve or store image information on the BancTec image archive and index database.

Another feature of at least one embodiment of the image access server system is load balancing and failover support. The image access server system is provided with redundancy and contingency sites to protect the operation of the image access server system from, for example, a natural disaster, major telecommunications outage, or total equipment failure. Accordingly, the image access server system supports multiple servers and server sites.

Load balancing takes place automatically to load balance network traffic between servers at a server site on a round robin basis. The image access server system routes logon requests to the least busy image access server system application interface. In the event that load statistics are not available, the image access server system will route logon requests to the next available image access server system application interface.

In the event of a failure of the primary Web, application, database, fax, or Item Client server within a site, the secondary server within the site will automatically handle the transactions. In the event of a catastrophic Web server failure (both the primary and secondary Web server), all production, traffic will be re-routed to the remaining production site. In the event of a catastrophic application server failure, (both the primary and secondary application server), all production traffic will be re-routed to the remaining production site. In the event of a catastrophic database server failure (both the primary and secondary database server), all production traffic will be re-routed to the remaining production site(s). In the event of an Item Client server failure, Item Client traffic will be re-routed to remaining production site. In the event of a catastrophic fax server failure, jobs will be re-routed to the remaining production site. Appendix A provides the detail of the loading balance and failover of at least one embodiment of the image access server system.

In at least one embodiment, a CORBA client application of the image access server system comprises one or more objects with properties defining the primary and backup sites for connection to the image access server system. In the image access server system, an object request broker (ORB) is instantiated when the object(s) of the CORBA client application invokes an operation on one or more objects in the image access server system. The communication is performed via the primary site for connection to the image access server system. Where the primary site fails or is otherwise unavailable, the instance of the ORB is destroyed and a new instance of an ORB is created with modified properties to make the connection from the object(s) of the CORBA client application to a back-up site in the object. By creating a new instance of the ORB and modifying the connection properties of the ORB at instantiation, the image access server system avoids the inability to modify static properties of an ORB once instantiated and avoids the automatic adoption of the static properties of a previous instance of an ORB.

Figure 9:
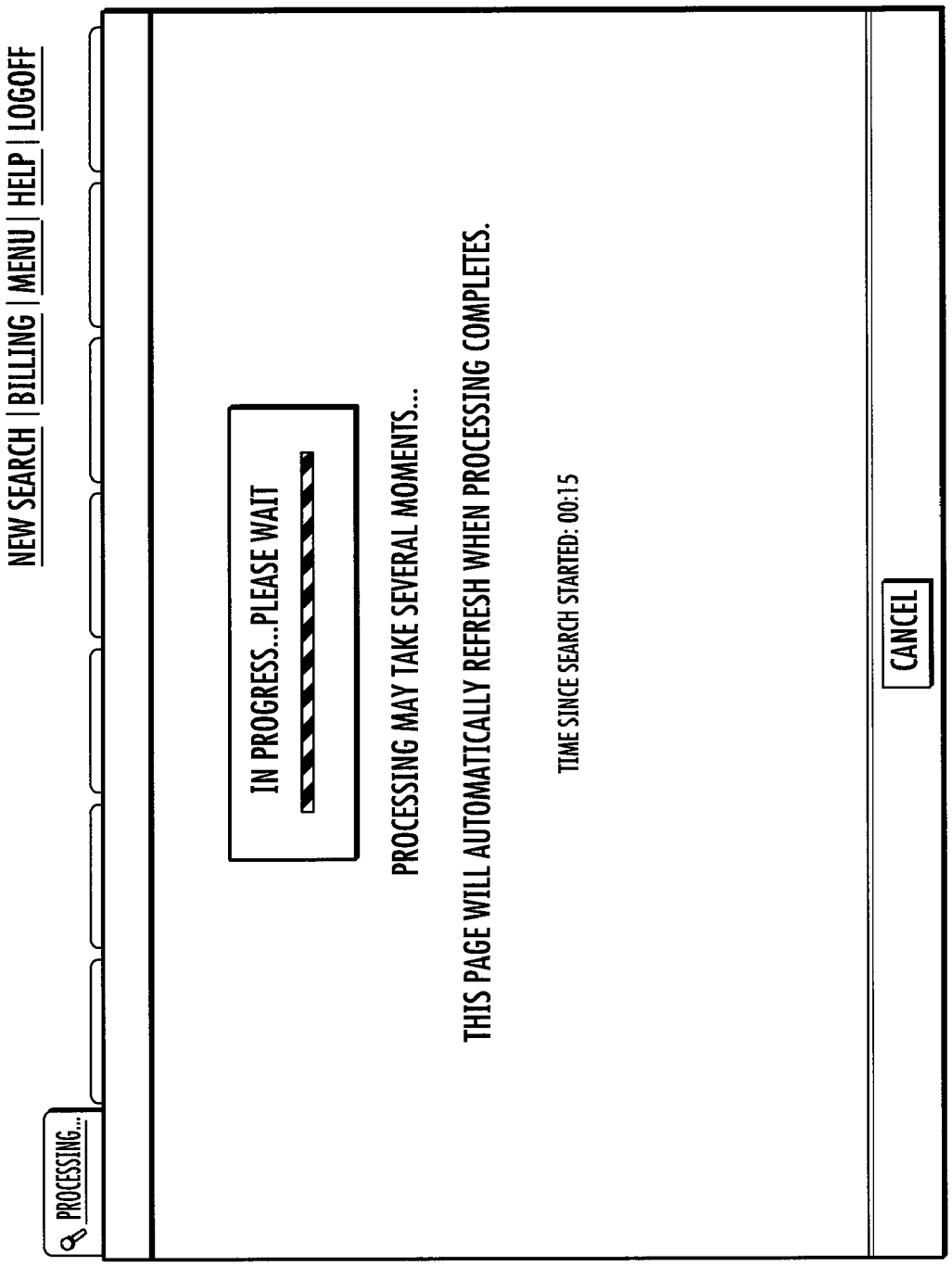
FIG. 9 illustrates an implementation of a processing screen in accordance with at least one embodiment of the invention.

A further feature of the image access server system is an improved polling technique. When a client application sends a polling request, the image access server system holds the response to the polling request for a predetermined period of time (e.g., 5 seconds) to determine if it can complete the outstanding request of the client application and provide the results to the client application. So, instead of immediately returning a response indicating that the request has not yet been performed, the image access server system is able to more efficiently process polling requests. In at least one embodiment, the predetermined period of time may be modified according to the type of client application making the polling request (e.g., the type of browser) and according to the performance of the image access server system to more effectively provide request results in response to polling request (instead of indications that the request has not yet been performed). In the case of browsers, the polling technique is able to extend the time-outs of certain browsers such as the Microsoft Internet Explorer browser product. In at least one embodiment, a screen, such as depicted in FIG. 9, is provided on the client application while polling requests are processed.

Image Viewer

According to at least one embodiment of the invention, a particular type of client application is an image viewer. The image viewer is a Web-based application and framework that provides image viewing and input capability to end-users. In at least one embodiment, the image viewer client application connects to the image access server system via the image access API. In at least one embodiment, the image viewer application comprises software programmed according to the Java language and uses HTML and HTTP technology to provide the image viewer functionality described below in a Web browser, such as the Microsoft Internet Explorer software application.

As described hereafter, in at least one embodiment, the image viewer application is configured to access check information, including check images and other, check information, of financial institutions. As will be apparent to those skilled in the art, the image viewer can be configured and/or extended to any type of image information.

Upon instantiation of the image viewer application, an image viewer home screen is displayed to the user. In at least one embodiment, the image viewer application is instantiated by starting a Web browser using a URL for the image viewer home screen. Alternatively, the Web browser may already have been instantiated and the URL for the image viewer application is entered into or on the browser. The image viewer home screen (not shown) displays basic support information and provides a list of functions that are available. The user can select from various versions of image viewer application and/or download the plug-ins required as a pre-requisite for viewing images. A one-time install of the plug-in is required. The user simply "clicks" on the desired choices provided on the screen.

Referring to FIGS. 6-23, an implementation of various image viewer screens in accordance with at least one embodiment of the invention is depicted. The screens provide various links, buttons, dropdown boxes, checkboxes, etc. To access particular screens, the user may select an appropriate link or be directed to the screen upon "clicking" on a "Submit" button. For example, upon user selection of a link, an HTTP-formatted request for one or more interactive HTML or XML pages corresponding to the selected screen may be transmitted to the image viewer system. Similarly, "clicking of a "Submit" button may cause an HTTP-formatted command be transmitted to the image viewer system to perform the requested actions corresponding to the screen. In response to a selection of a particular screen by, for example, receiving a hyperlinked request, the image viewer system may generate and transmit to the users client the requested screen, comprising one or more interactive HTML or XML pages with, for example, requested image information. To generate the HTML or XML page(s) of the screen, the image viewer system causes various operations to be performed as described in more detail above in regards to the image access server system.

Figure 6:
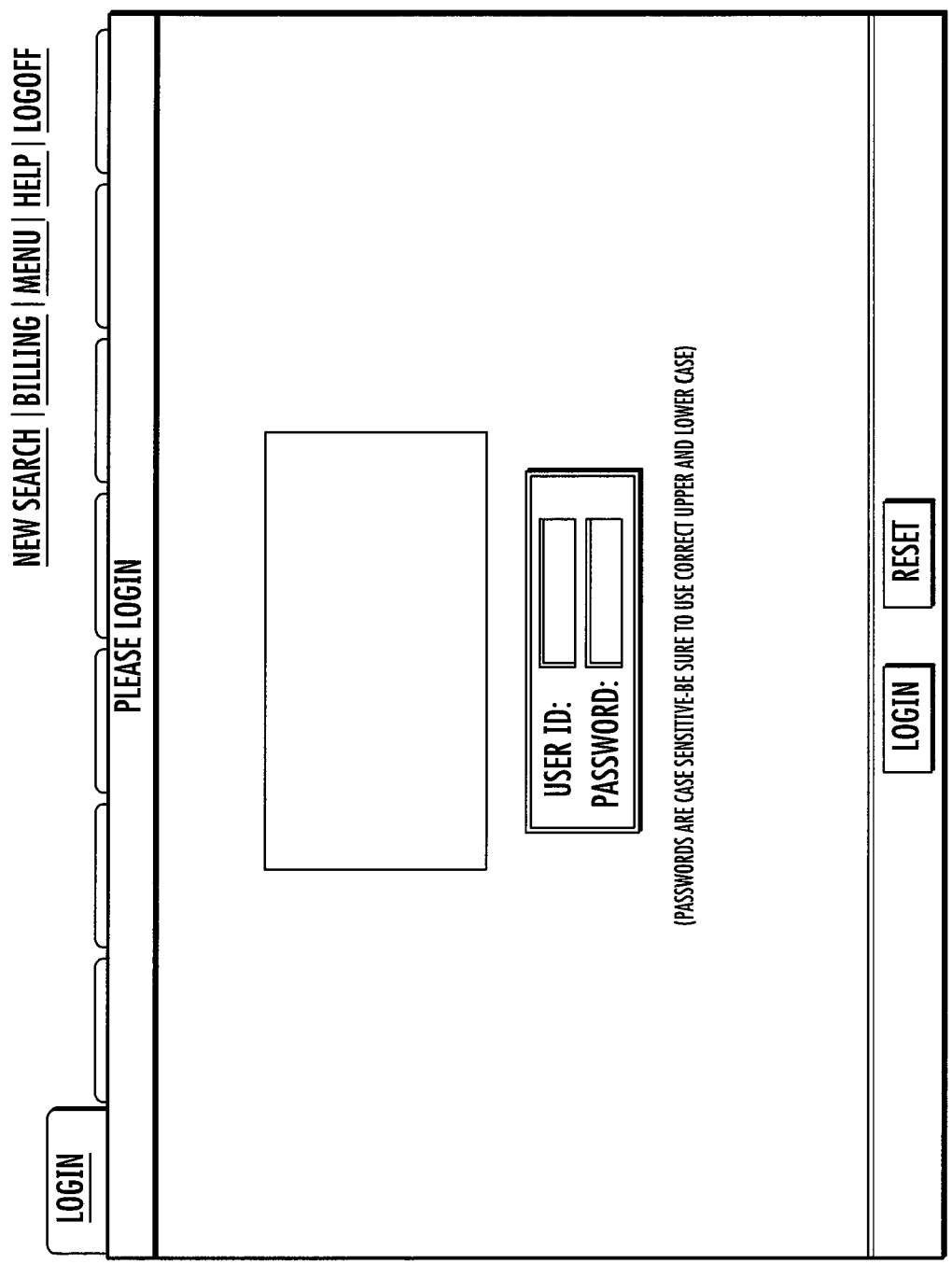
FIG. 6 illustrates an implementation of a logon screen in accordance with at least one embodiment of the invention.

Referring to FIG. 6, a Logon, screen of the image viewer application is depicted. The Logon screen is used to verify that the user is authorized to use the image viewer application and where applicable, the image access server system. The user must provide data in the User ID and Password fields—valid user identification (user ID) in the User ID field and a valid password in the Password field. Once the data is entered, the user "clicks" on the "Logon" button or presses "Enter" on the keyboard. The user ID and password will be validated, against the image viewer and/or image access server system security/user database. The "Reset" button allows the user to clear out the input fields on the Logon screen.

Security error messages will appear based on whether a user ID and/or password is invalid, a password needs to be, changed, access has been revoked, or a user ID has been locked-out. An invalid user ID will result in the following error message being displayed: "Logon NOT ok. User ID not valid." An invalid password will result in the following error message being displayed: "Logon NOT ok. Password not verified for user xxxx" where xxxx is the user ID entered into the LOgon screen by the user. A password that has not been changed in the last 90 days will result in the following error message being displayed: "You are required to change your password at this time." Users will be required to change their password every 90 days. A user ID that has been revoked due to 120 days of inactivity will result in the following message being displayed: "Your user account is inactive. Please contact _____ for assistance." A user ID that has been locked-out due to 3 consecutive failed login attempts will result in the following error message being displayed: "You user account is locked. Please contact _____ for assistance." A change password function will be available on a Menu screen (discussed in more detail below).

Additionally, several links are provided on this Logon screen as well as on other screens. The "New Search" link allows the user to go to the Search screen (discussed in more detail below). The "Billing" link allows the user to go to the Update Billing Information screen (discussed in more detail below). The "Menu" link allows the user to go the Menu screen (discussed in more detail below). The "Help" link allows the user to access the online user manual. Lastly, the Logoff link returns the user to the Logon screen.

Referring to FIG. 7, a User Registration screen is depicted. The User Registration screen is used to capture user information that will assist in tracking usage and geographical metrics. The User Registration screen appears when a new user logs on for the first time. The user must provide a first name, last name and mail code in the respective First Name, Last Name, and Mail Code fields. Mail code information is information to identify the location of a user. The mail code could be, for example, a ZIP code, an internal organization identifier or geographic locator. Error messages are provided if entries are not made in one or more of the relevant fields. The "Submit" button allows the user to submit the entered information. The "Cancel" button allows the user to cancel submission of the entered information.

Referring to FIG. 8, a Search screen is depicted. The Search screen is used to capture the search criteria for image information that the user is attempting to access. For example, a user can through the Search screen select either one particular image (with sufficient search criteria) or an entire range of images.

In at least one embodiment, the user must select either the Account Number or the Sequence Number radio button in the "Search by" section. If the Account Number button is selected, the user can search by account number(s). If the Sequence Number button is selected, the user can search by sequence number(s). If Account Number is selected, Capture Date and Account Number are required; Amount and Check/Serial Number are optional. If Sequence Number is selected, Capture Date and Sequence Number are required; Amount and Check/Serial Number are optional. The user is required to enter valid search criteria and "click" on the "Search" button or press the "Enter, button on the keyboard, which will initiate the search. The "Reset" button will clear all fields on the screen.

The Capture Date field must contain a valid date in the format of mm/dd/yyyy. If entering a date range, the second date must also be in the mm/dd/yyyy format and must be later than the first date entered. The Account field must contain a numeric value. The Sequence Number field must contain a numeric value. No alpha or special characters are allowed. If entered, the second sequence number must also be numeric and must be higher number than the first sequence number entered. The Amount field must contain a valid amount. Decimal and commas are allowed. If entered, the second amount must also be numeric and must be higher than the first amount. The Check/Serial Number field must contain a numeric value. No alpha or special characters are allowed, if entered, the second Check/Serial number must also be numeric and must be a higher number than the first Check/Serial number entered.

A number of error messages are provided for the Search screen. Data in the Capture Date field in the wrong format will result in the following error: "Invalid Date". A date range where the first date is higher than the second will display: "Date range invalid". An Account field value that is non-numeric will result in the following error: "Invalid Account". A sequence number range where the first number is higher than the second will display: "Number range invalid". An Amount field value that is not valid will result in the following error: "Invalid Amount". Also an amount range where the first amount is higher than the second will display: "Amount range invalid". A Check/Serial Number field range where the first number is higher than the second will display: "Number range invalid". If valid search criteria are entered, but no images match the criteria, the following message will be displayed: "No Images Found". If greater than a maximum amount of items match the search criteria, then the search results screen (e.g., the Pick List screen described below) will display the following message, "Search Results—xxxx Items Found (Display Limit Reached)" where xxxx is the maximum of items that may returned.

Referring to FIG. 9, a Processing screen is depicted. The Processing screen is displayed while waiting on the results of a search or while waiting on the results from an image request. The screen automatically refreshes when processing completes. The user may "click" on the "Cancel" button to cancel the request and bring the user back to the screen from which the processing began.

Referring to FIG. 10, a Pick List screen is depicted. The Pick List screen displays the list of images that match the search criteria from the Search screen. The user can select items from the list for viewing. To view images, the user must select one or more images from the pick list. This can be accomplished by "clicking" the check box to the left of each desired image, or "clicking" the "Select All" button at the bottom of the screen.

In at least one embodiment, a certain maximum amount of items can be viewed, billed, faxed or remotely printed at one time. If more than the maximum amount of images are selected for viewing, faxing, or remote printing, the following error message will be displayed: "Too many images selected. The first xxxx images selected will be retrieved." where xxxx is the maximum amount. If more than the maximum amount of images are selected for billing, the following error message will be displayed: "Too many images selected; the first xxxx images selected will be available for billing." where xxxx ii the maximum amount.

The "Select" check buttons (provided in the second column from the left) allow the user to select one or more items to view, fax, print or bill. "Sequence", "Check/Serial", "Amount", "Account", "Capture Date", "Location", and "ABA Number" links (provided at the top of the third, fourth, fifth, sixth, seventh, eight and ninth columns from the left (not shown)) allow the user to sort pick list items in ascending/descending order according to the particular link selected e.g. picking the "Sequence" link will sort based on sequence number. The "View" button allows the user to view selected items. The "Select All" button allows the user to select all pick list item checkboxes. The "Select None" button allows the user to deselect all pick list item checkboxes. The "Redo" button allows the user to rerun the most recently run search to refresh the search results. The "Bill" button allows the user to bill for the selected pick list item(s). The "Send Items" dropdown box allows the user to select either to fax or remotely print the selected item(s).

Figure 11:
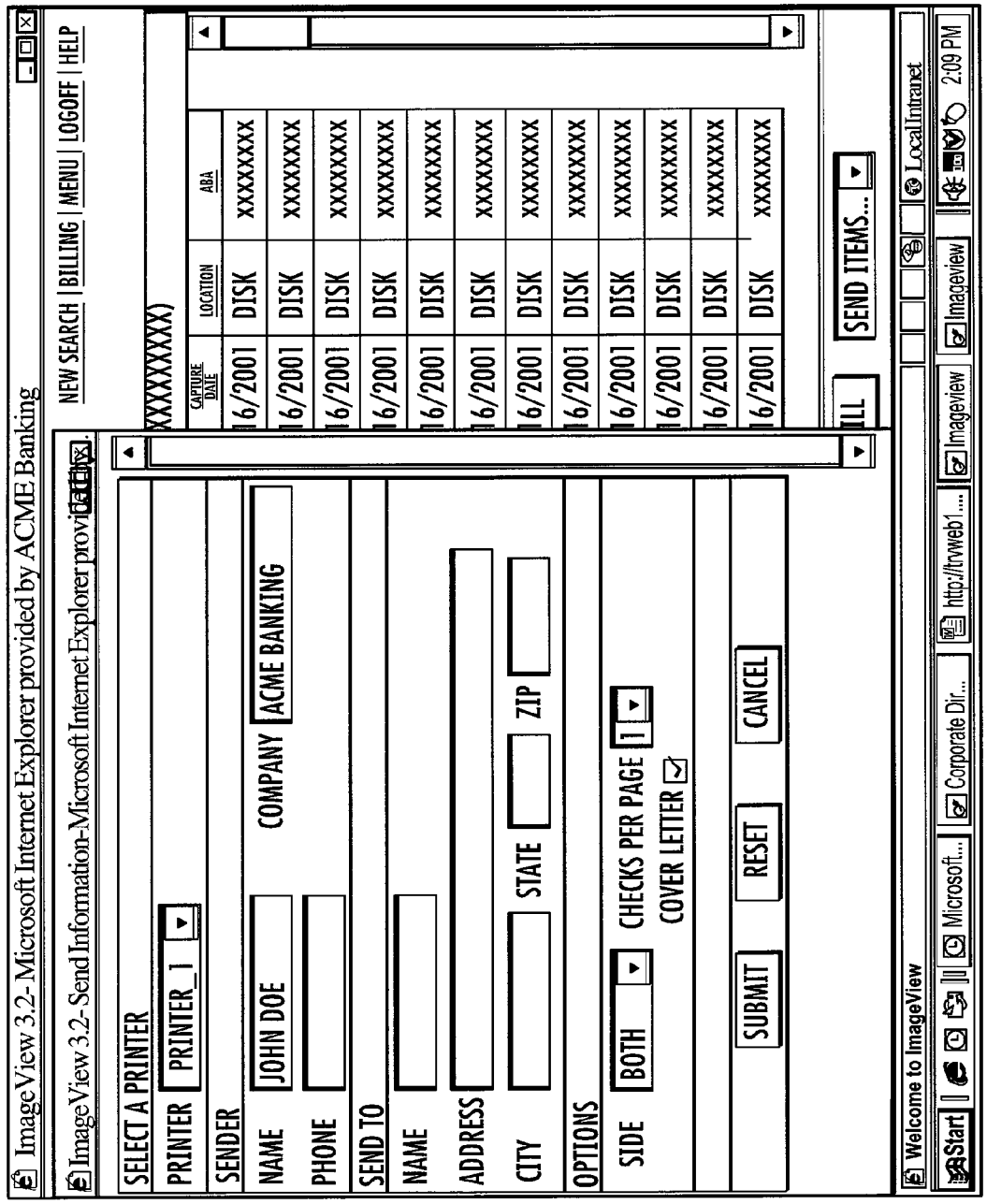
FIG. 11 illustrates an implementation of a remote print interface display screen in accordance with at least one embodiment of the invention.

Referring to FIG. 11, a Remote Print Interface Display screen is depicted. The Remote Print Interface Display screen pops up once a user has selected one or more items and has chosen the remote print option from the "Send Items" dropdown box. In order to remote print one or more items, the user must choose a printer, complete the sender name, the recipient name and recipient address. Appropriate error messages are provided if the required data is not provided.

The "Printer" dropdown box allows the user to select the target printer for the selected pick list item(s). The "Sender Name" field allows the user to enter their name. The default name is pulled from the user profile. The "Sender Telephone" field allows the user to enter their phone number. The "Company" field allows the user to enter the sender's company name. The default company name is pulled from the user profile. The "Send To Name" field allows the user to populate the recipients name. The "Send To Address" field allows the user to populate the recipient's address, including city, state, and ZIP code. The "Sides" dropdown box allows the user to select either the front or both sides of the selected pick list item(s). The "Checks Per Page" dropdown box allows the user to select either 1 or 4 check images per printed page. The "Cover Letter" checkbox allows the user to print a standard cover letter with the printed selected pick list item(s). The "Submit" button allows the user to submit the remote print request for the selected pick list item(s). The "Reset button allows, the user to clear out the input fields on the screen. The "Cancel" button allows the user to stop the remote print function.

Figure 12:
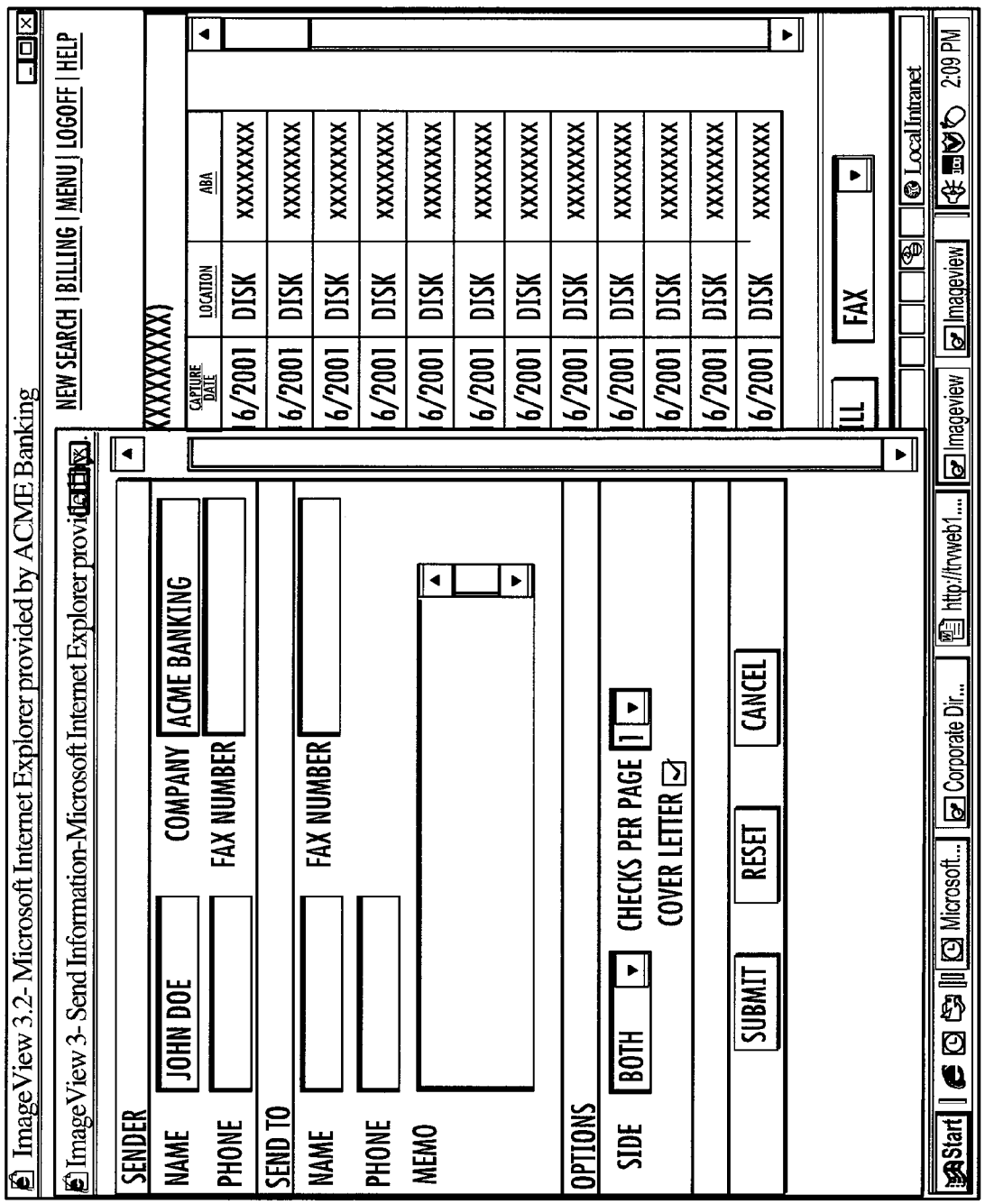
FIG. 12 illustrates an implementation of a fax interface display screen in accordance with at least one embodiment of the invention.

Referring to FIG. 12, a Fax Interface Display screen is depicted. The Fax Interface Display screen pops up once a user has selected one or more items and has chosen the fax option from the "Send Items" drop down box. In order to fax one or more selected items, the user must enter the senders name, phone number and fax number and the recipients name and fax number. Appropriate error messages are provided if the required data is not provided.

The "Sender Name" field allows the user to enter the sender's name. The default name is pulled from the user profile. The "Sender Telephone" field allows the user to enter the senders phone number. The "Company" field allows the user to enter the sender's company name. The default company name is pulled from the user profile. The "Sender Fax Number" field allows the user to enter the senders fax number. The "Send To Name" field allows the user to populate the recipient's name. The "Send To Phone Number" allows the user to enter the recipient's telephone number. The "Send To Fax Number" field allows the user to enter the recipients fax number. The "Memo" field allows the user to write a message pertaining to the images being faxed. The "Sides" dropdown box allows the user to select either the front or both sides of the selected pick list item(s). The "Checks Per Page" dropdown box allows the user to select either 1 or 4 check images per printed page. The "Cover Letter" checkbox allows the user to print a standard cover letter with the printed selected pick list item(s). The "Submit" button allows the user to submit the remote print request for the selected pick list, item(s). The "Reset" button allows the user to clear out the input fields on the screen. The "Cancel" button allows the user to stop the remote print function.

Figure 13:
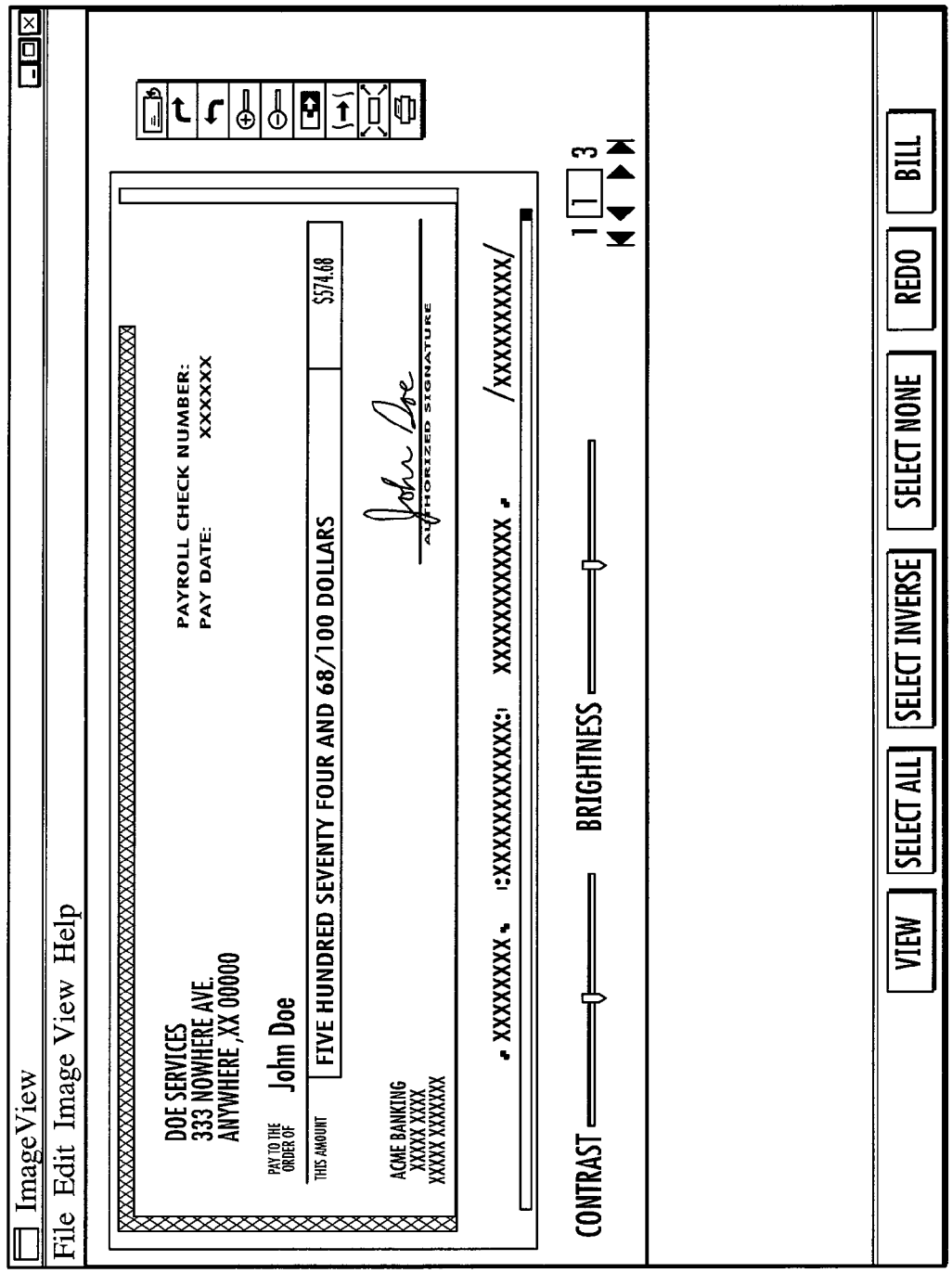
FIG. 13 illustrates an implementation of an image plug-in display screen in accordance with at least one embodiment of the invention.

Referring to FIG. 13, an Image Plug-in Display screen is depicted. The Image Plug-In Display screen shows the images that have been retrieved for viewing. The Image Plug-In Display screen provides several buttons for use in manipulating the image. These include switching between front and back, rotating left and right, zooming in and out, displaying a negative image, enhancing the image, fitting the image size to the window, and printing the item. To close the Image Plug-In Display screen, the user must "click" on the X (close box) in the upper right corner of the Image Plug-In Display screen.

The "Next View" button (the top button on the right hand side) allows user to see the reverse side of the image. The "Rotate Image Right" button (the second button from the top on the right hand side) allows user to rotate the image 90 degrees to the right. The "Rotate Image Left" (the third button from the top on the right hand side) button allows user to rotate the image 90 degrees to the left. The "Magnify Image" button (the fourth button from the top on the right hand side) allows user to zoom in on the image. The "Shrink Image" button (the fifth button from the top on the right hand side) allows the user to zoom out of the image. The "Reverse Image Colors" button (the sixth button from the top on the right hand side) allows the user to reverse the image colors~ The "Enhance Image" button (the seventh button from the top on the right hand side) allows the user to view an enhancement of the front of an image of the selected item. The "Fit Image to Window" button (the eighth button from the top on the right hand side) allows the user to resize the image to fit the size of the window. The "Print" button (the ninth button from the top on the right hand side) allows the user to print item images. The scroll bar allows the user to move the image around within the window. The "Contrast" slide button allows the user to increase or decrease the amount of color on the image. The "Brightness" slide button allows the user to increase or decrease the level of light on the image. The "First Image" button (the first arrow from the left in the bottom right hand corner) allows the user to go to the first image loaded in the viewer. The "Revert To Prior Image" button (the second arrow from the left in the bottom right hand corner) allows the user to view the prior image loaded in the viewer. The "Advance To Next Image" button (the third arrow from the left in the bottom right hand corner) allows the user to view the next image loaded in the viewer. The "Last Image" button (the fourth arrow from the left in the bottom right hand corner) allows the user to view the last image loaded in the viewer.

Figure 14:
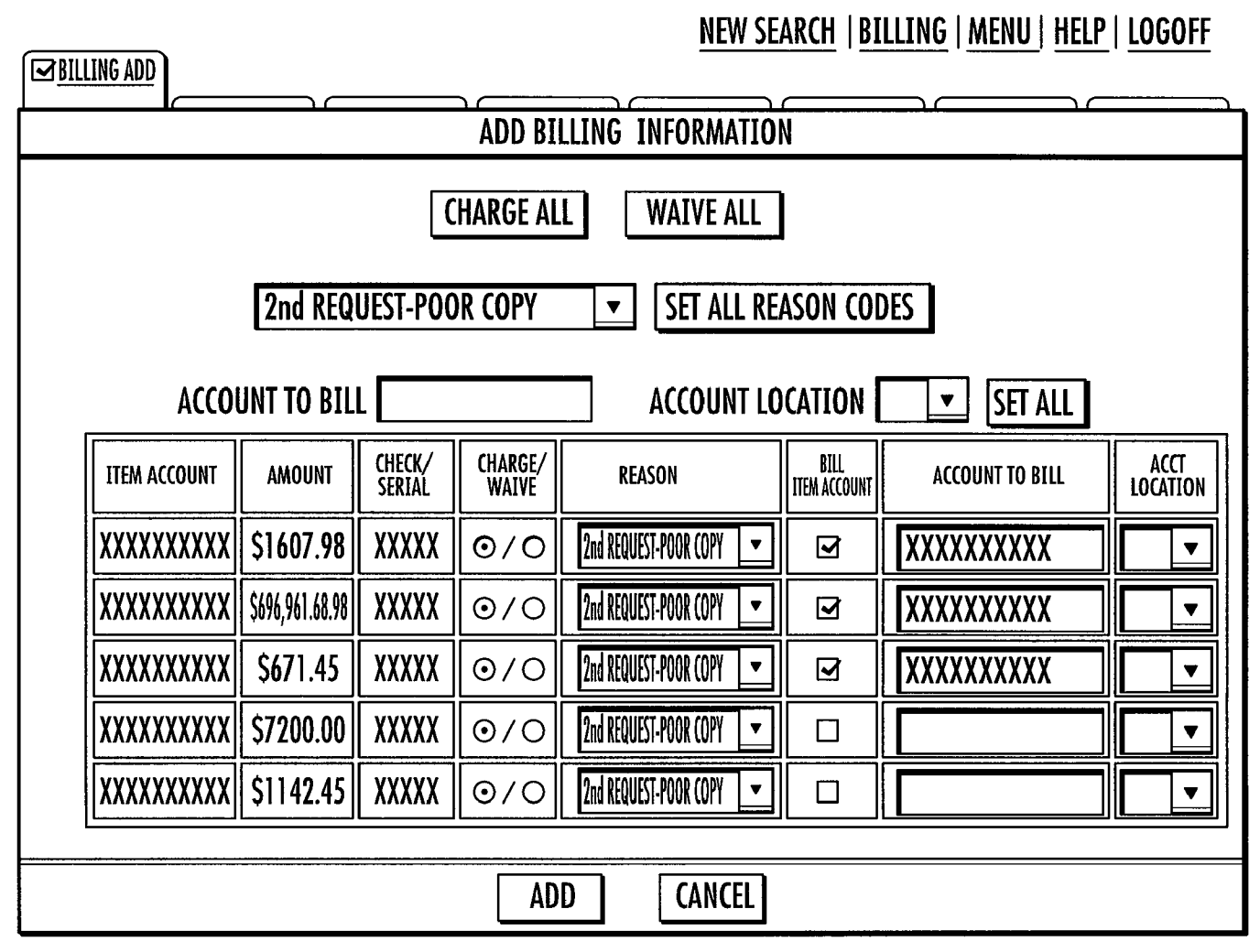

Referring to FIG. 14, an Add Billing screen is depicted. The Add Billing screen is presented when the "Bill" button is selected on the Pick List screen. The Add Billing screen is used to capture billing information for selected images. All items selected will be listed on this screen. The top of the screen provides the options to charge all or waive all, set the same reason code for all items, set all "Account to Bill" field next to the items to the same account number provided in the top "Account to Bill" field, and set all "Acct Location" field next to the items to the same location provided in the top "Account Location" field. "Clicking" on the Add button will capture the updated information and return the user to the previous Pick List screen. The "Cancel" button will cancel any changes made and return the user to the previous Pick List screen.

The "Charge/Waive" button must be selected for each item. The default is to charge each selected item. The "Charge All" button allows the user to set the charge status to charge the account for all items on the screen. The "Waive All" button allows user to set the charge status to waive the account for all items on the screen. The "Reason Code" drop down box next to each item and the top of the screen is used to explain why an item was charged or waived. The default is that the customer needs a 2" copy. Other reason codes include: Customer Lost Item, Customer Never Received Item, 2" Request—Poor Copy," Possible Bank Error, Possible Forgery/Fraud, Auditing Request, Regular Subpoena, Request for Internal Research, Non-Disclosure Subpoena, Truncated, and Current Cycle Request The "Set All Reason Codes" button allows the user to select the reason code for all items according the reason code, selected in the "Reason Code", drop down box at the top of the screen. The "Account to Bill" field next to each item will display the account number depending on whether the user populates the account to be billed field at the top of the screens or chooses to select the "Bill Item Account" check box to charge the account associated with the image selected. The user can modify the default bill to account by editing the "Account to Bill" field. The "Account Location" field next to each item is used to select the state where the billed to account is domiciled. The "Account Location" field must be filled in. The "Account to Bill" field at the top of the screen allows the user to enter the account number to which charges are billed for all items. Similarly, the "Account Location" field at the top of the screen allows the user to select the account location for all items. The "Set All" button allows the user to set selections for all items entered in the top "Account to Bill" and "Account Location" fields. The "Add" button allows the user to submit selections on this screen. The "Cancel" button allows the user to cancel selections made on this screen and return to the Pick List screen.

If a user attempts to add an item to be billed without choosing providing appropriate data in the "Account Location" field, the following message will appear "You must select an Account location." If items that have previously been billed or waived on that particular date are selected on the Pick List screen and then the "Bill" button is selected on that screen, the following message will appear: "Items requested that have already been billed will not be displayed again".

Figure 15:
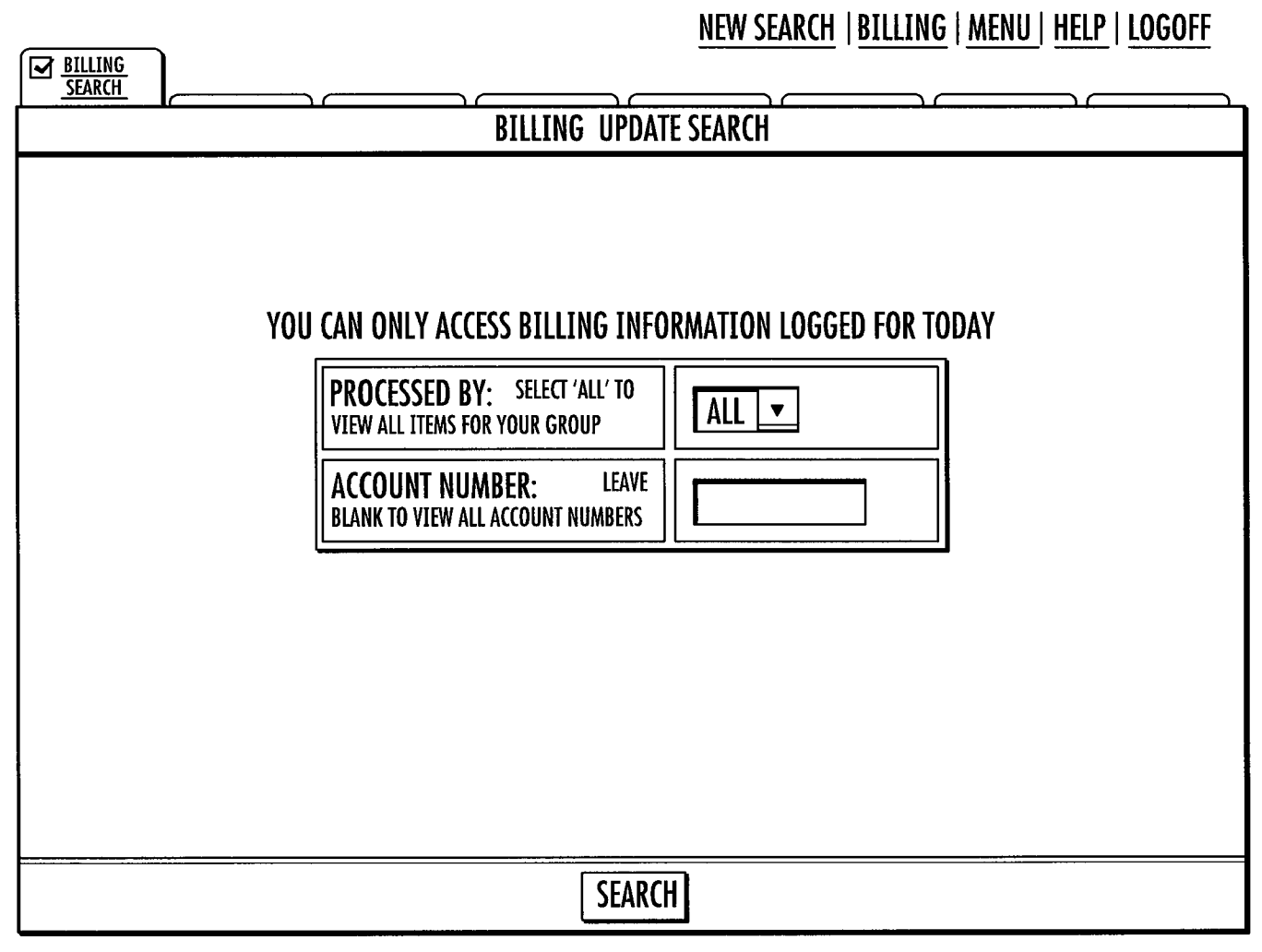

Referring to FIG. 15, a Billing Update Search screen is depicted. The Billing Update Search screen is used to search for previously captured billing records for review or update. The user navigates to this screen via the "Bill" link on the top bar of links. The Billing Update Search screen provides a method to search for all items worked in billing or by a specific user or by a specific account number. In at least one embodiment, all search results will be for the current day only and retrieved from the image viewer database. An unsuccessful search will result in an error message stating that "No billing items returned. You can only access billing information logged for today." The "Processed By" drop down box allows the user to select a user ID as billing search criteria. The "Account Number" field allows the user to enter a specific account number as billing, search criteria. The "Search" button allows the user to initiate the search.

Referring to FIG. 16, an Update Billing Information screen is depicted. The Update Billing Information screen provides an opportunity to modify previously captured billing information. In at least one embodiment, updates are only available to the current day billing information. The user navigates to this screen via the Billing Update Search screen.

The Update Billing Information screen provides a list of the billing available for update. The list includes the ID of the individual who captured the information originally, the ID of the individual who last updated the record, the account, the item amount, and the item check number. The user has the option to update through the "Charge/Waive" button, the "Reason" dropdown box, the "Charge to Account" field (not shown), and, the "Account Location" field (not shown). The total number of items "Waived", and the total number of items "Charged" are listed at the bottom. The "Update" checkbox next to each item will need to be selected if changes to that items billing information are to be captured. The "Update" button at the bottom is used to capture the changes entered. The "Cancel" button will cancel all changes made.

When the "Account Location" field is left blank the error message" You must select an Account location" appears. When the "Charge" button is selected and the "Account to Bill" field is left blank the error message "You must select an Account to bill" appears.

Figure 17:
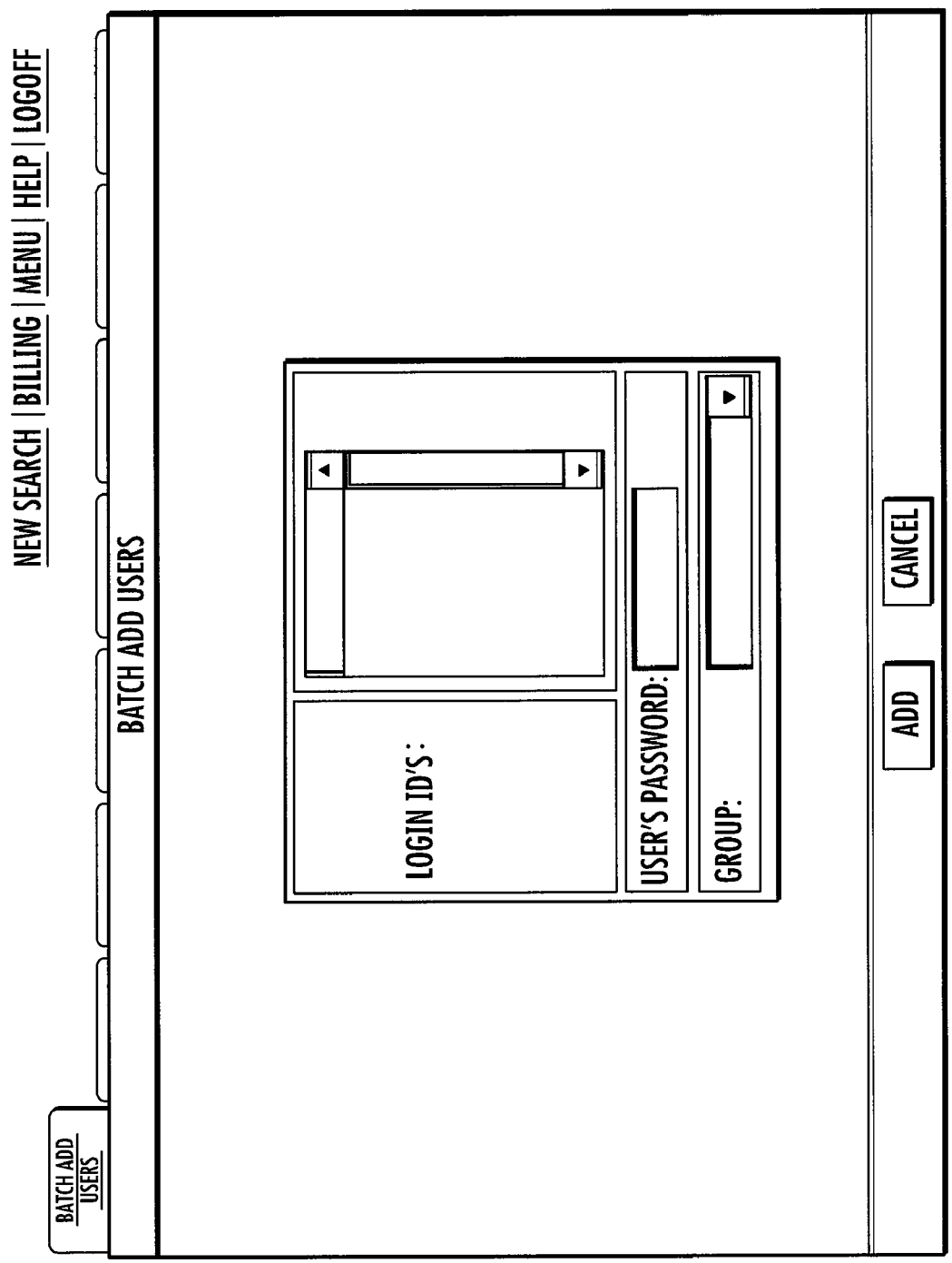
FIG. 17 illustrates an implementation of a batch add user screen in accordance with at least one embodiment of the invention.

Referring to FIG. 17, a Batch Add User screen is depicted. The Batch Add User screen allows multiple user IDs with in the same group ID to be added at one time for use in the image viewer application. To access this, functionality, a user must have administrative rights assigned to them at the user change level. The administrator assigns an initial password for the entire group in the "Users Password" field. The administrator will select the new users group from a list of existing group IDs in the "Group" dropdown box. In this screen, the "Login ID" field, "Users Password" field and "Group" dropdown box must be populated. Appropriate error messages are provided if required fields are not populated. The "Add" button allows the user to add new user information entered on the screen. The "Cancel" button allows the user to cancel addition of new users.

Figure 18:
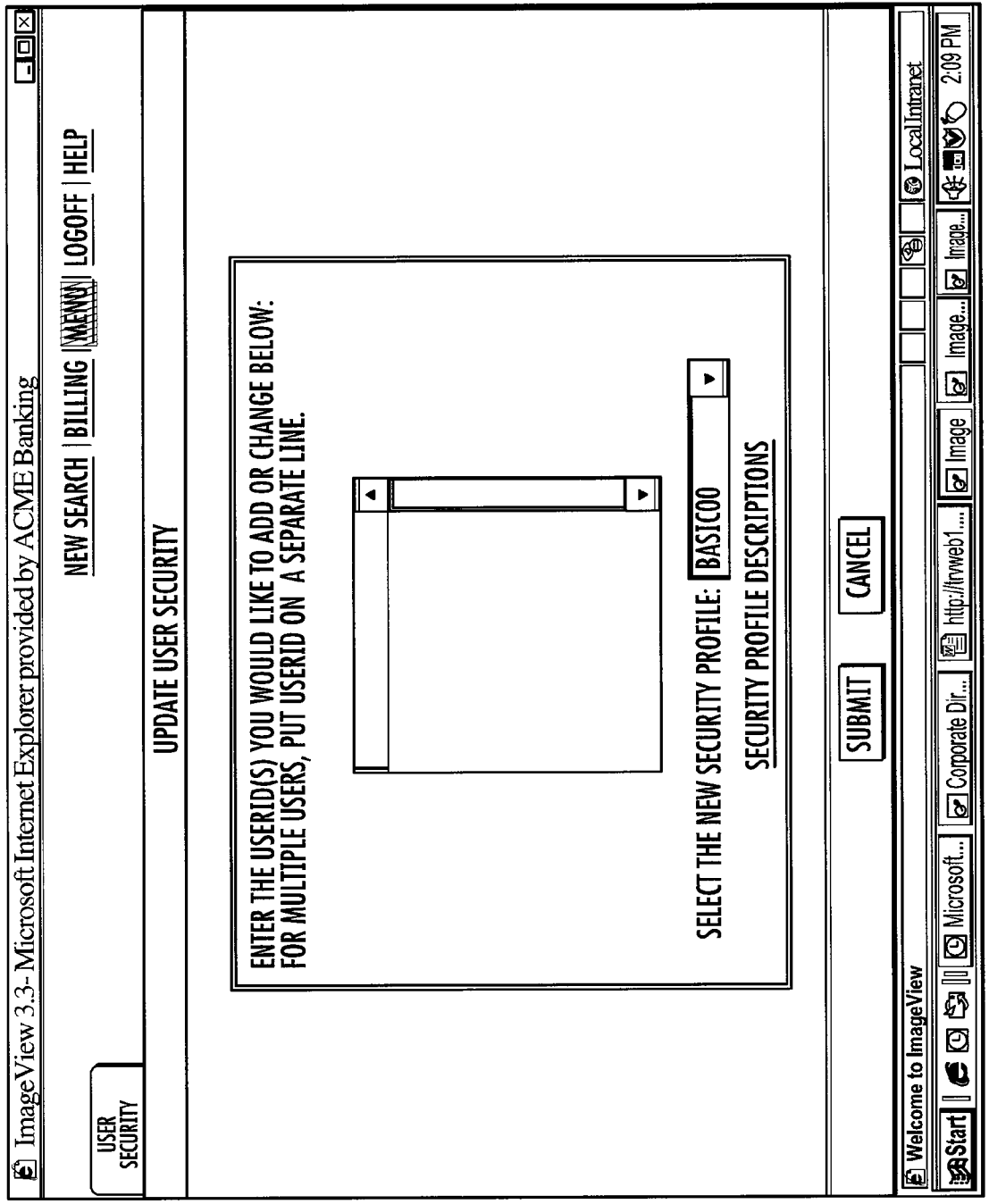
FIG. 18 illustrates an implementation of an update user security screen in accordance with at least one embodiment of the invention.

Referring to FIG. 18, an Update User Security screen is depicted. The Update User Security screen allows multiple user IDs to be updated at one time with new security profiles in the image viewer application. To access this functionality, a user must have administrative rights assigned to them at the user change level. The administrator selects the new users" security profile from a list of profiles in the "Select the new security profile" drop down box. In this screen, the "Login ID" field must be populated and the "Select the new security profile" drop down box must have a value selected. If an administrator attempts to change security profiles without entering information in the "Login ID" field, an error message reads: "You must enter Login IDs". The "Submit button allows the administrator to change user security profiles entered on this screen. The "Cancel" button allows the administrator to cancel out.

Figure 19:
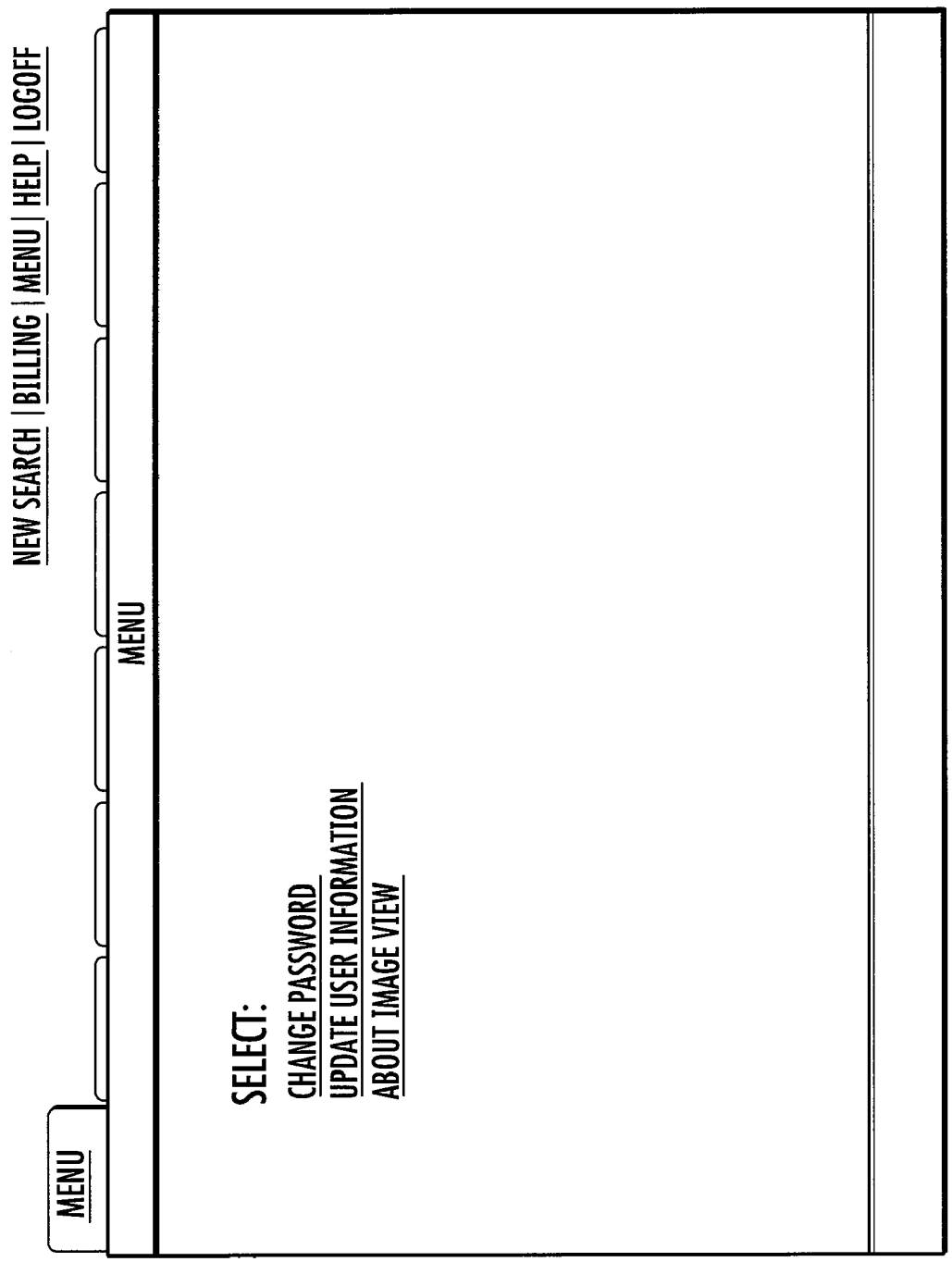
FIG. 19 illustrates an implementation of a menu, (regular user functionality) screen in accordance with at least one embodiment of the invention.

Referring to FIG. 19, a Menu (Regular User Functionality) screen is depicted. The Menu (Regular User Functionality) screen allows the normal user to change the users password, update user information and get information about the image viewer application. The "Menu" link on the top link bar will bring the normal user without administrative rights to the Menu (Regular User Functionality) screen with the following links: "Change Password", "Update User Information" and "About ImageView". To leave this screen, the user selects an alternate link on the top of screen.

Figure 20:
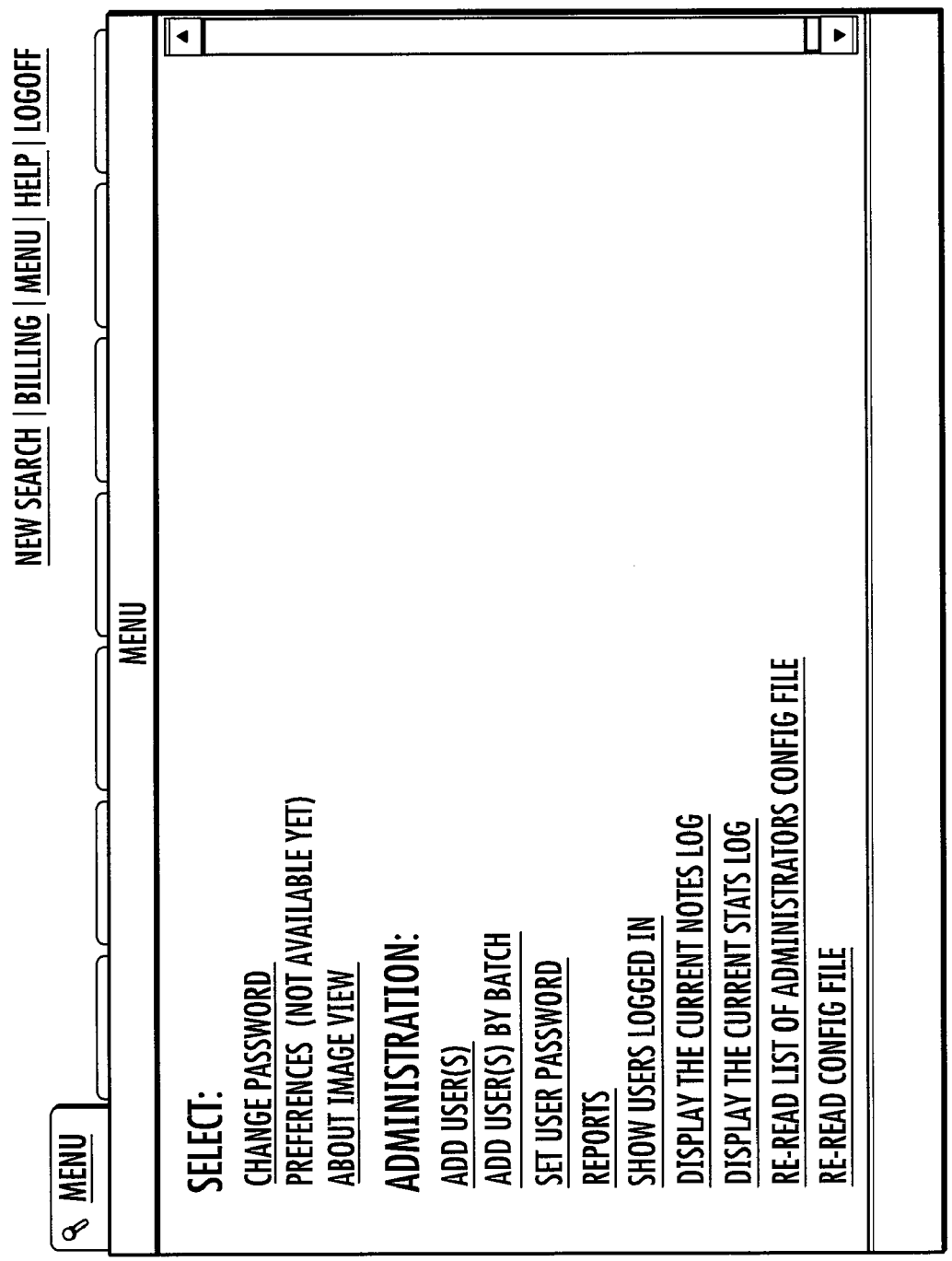
FIG. 20 illustrates an implementation of a menu (full administrative functionality) screen in accordance with at least one embodiment of the invention.

Referring to FIG. 20, a Menu (Full Administrative Functionality) screen is depicted. The Menu (Full Administrative Functionality) screen allows the full administrative rights user to change the administrative users password, update the administrative users information, get information about the image viewer application, add one or more users to the image viewer application one at a time, add users by batch, set user passwords, access administrative reports, update user security (not shown), update user status (not shown), view users logged in, display the current notes log, display the current image viewer application statistics log, reload the list of administrators configuration file, and reload the configuration file. The "Menu" link on the top link bar will bring the normal user without administrative rights to the Menu (Full Administrative Functionality) screen with the following links: "Change Password", Update User Information", "About ImageView", "Add User(s)", "Add Users by Batch", "Set User Password", "Reports", "Update User Security" (not shown), "Update User Status" (not shown), "Show Users Logged In", "Display the Current Notes Log", "Display the Current Stats Log", "Re-read List of Administrators Config File" and "Re-read Config File". To leave this screen, the user selects an alternate link, on the top of screen. As will be apparent to those skilled in the art, different levels of user rights may be provided which allows those user levels more or less administrative rights as provided in this screen.

Figure 21:
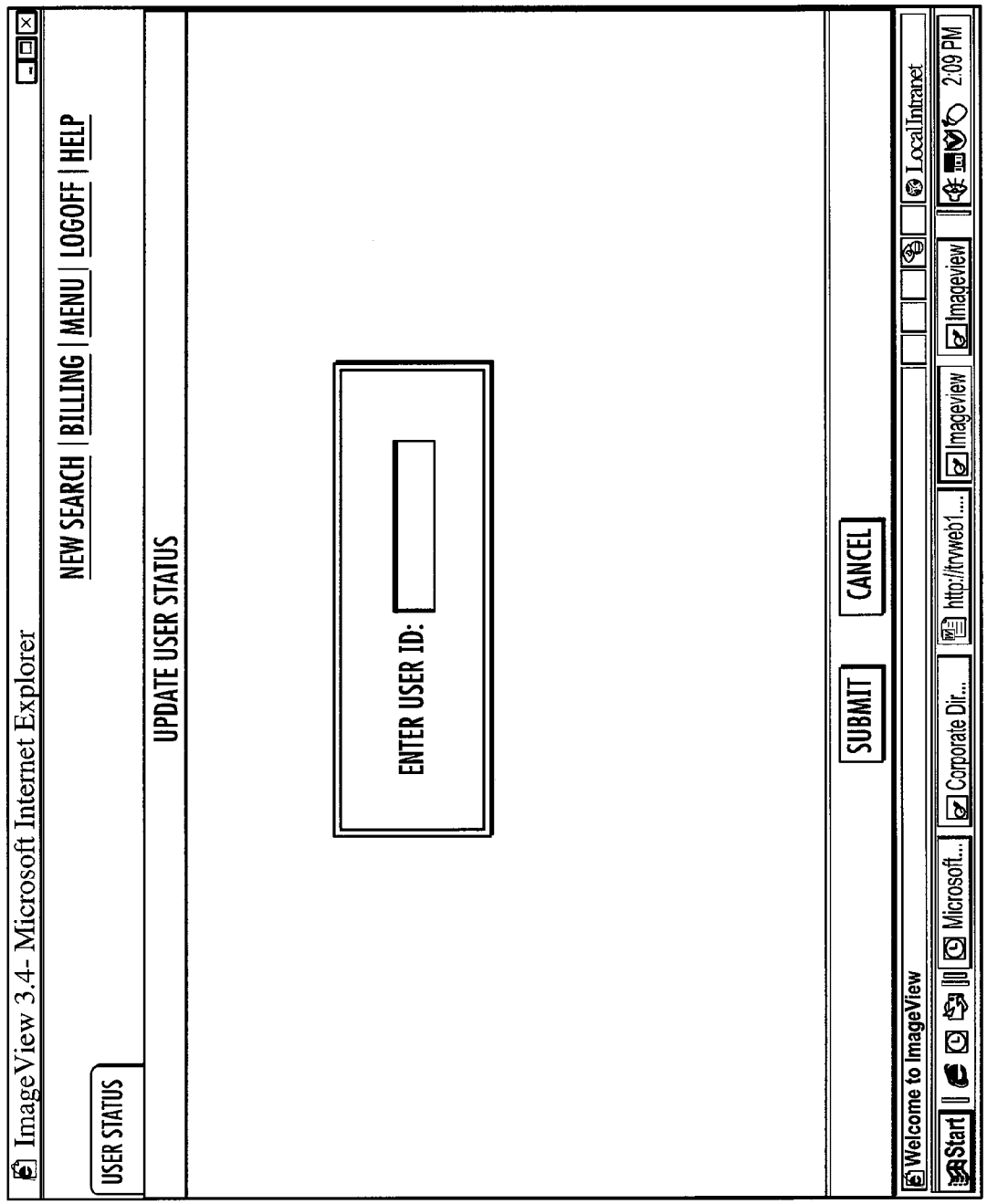
FIG. 21 illustrates an implementation of an update user status user ID specification screen in accordance with at least one embodiment of the invention.
Figure 22:
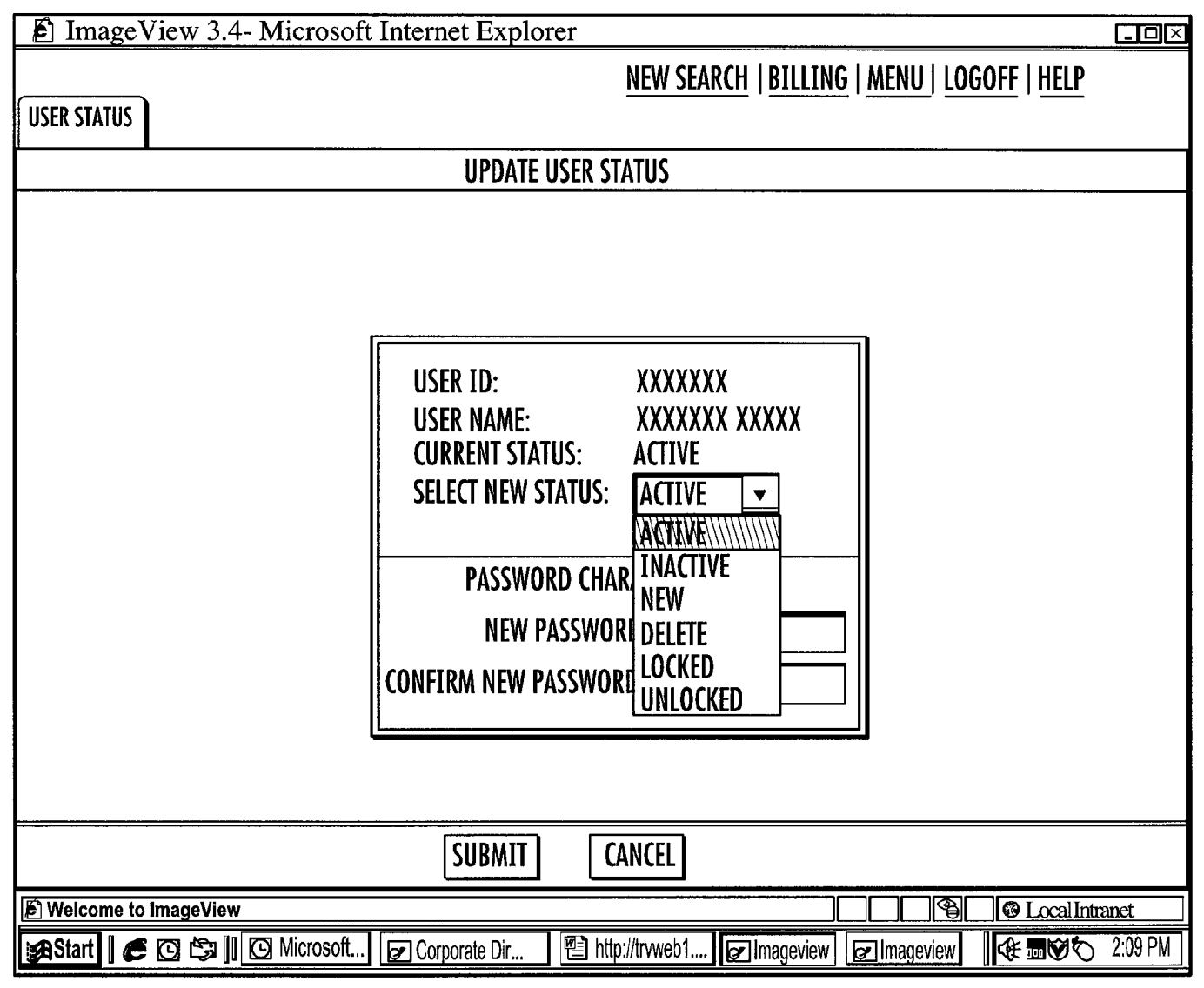

Referring to FIGS. 21 and 22, an Update User Status screens allow user administrators to perform maintenance on a specific user ID that they specify on the screen depicted in FIG. 21. The user administrator can reset a locked-out user, reactivate a user ID, expire (delete) a user ID and/or change a password for a user ID. The administrative user must enter a user ID. If an invalid User ID is submitted, an error message will indicate "ERROR: You entered an invalid User ID". The "Submit" button allows the user to submit the action. The "Cancel" button allows the user to cancel out. Once a user ID has been specified and submitted on the screen of FIG. 21, the screen of FIG. 22 allows user administrators to change a users status to Active, Inactive, New, Deleted, Locked or Unlocked. The "Select New Status" dropdown box allows the user to select the new status of a user ID. The status includes Active, Inactive, New, Deleted, Locked, and Unlocked. The "New Password" field allows the administrator to enter a new password for the designated user. The "Confirm Password" field allows the administrator to enter a password for the designated user as confirmation. The "Submit" button allows the user to submit the action. The "Cancel" button allows the user to cancel out.

Referring to FIG. 23, a Reports Menu screen is depicted. The Reports Menu screen allows an administrative user to access certain types of predetermined reports available within the image viewer application. The "Reread Report Definition" button allows the administrator to reload the screen to update the definitions of the predetermined reports showing on the screen or to add or delete reports to the screen. The administrator enters a start date in the "Start Date" field and an end date in the "End Date" field. Error checking and messages will ensure proper dates are entered. The administrator then selects any of the reports, desired by selecting the relevant "Run" button. The image viewer application will then run and prepare the relevant, report selected for the date range entered. The types of reports available to the administrator include "Total Image Retrievals by Location & Group", "Average Image Retrievals by Location & Group", "Average Age of Images Retrieved by Location & Group", "Average Number of Requests per Location & Group" and "Image Retrieval Success versus Failure Statistics". FIGS. 24 to 28 depict screens for each of these reports.

Referring to FIG. 24, a Total Image Retrievals by Location & Group report screen displays the information regarding all requests for images. The location ID column indicates the location of a particular image. The group code column indicates the group code for the image. The count column indicates the number of times the image was retrieved. The average times in seconds column indicates the average time taken in seconds to retrieve the image.

Referring to FIG. 25, an Average Image Retrievals by Location & Group report screen displays the information regarding average image retrievals by location and group, sorted by location. The location ID column indicates the locations of images. The group code column indicates the group code for the location. The average count column indicates the number of times images are retrieved from the location.

Referring to FIG. 26, an Average Age of Images Retrieved by Location & Group report screen displays the information regarding average age of the images retrieved by location and group, sorted by location. The location ID column indicates the locations of images. The group code column indicates the group code for the location. The average age in days column indicates the average age of images retrieved from the location.

Referring to FIG. 27, an Average Number of Requests per Location & Group report screen displays the information regarding the average number of requests for images by location and group, sorted by location. The location ID column indicates the locations of images. The group code column indicates the group code for the location. The average server requests column indicates the average number of requests for images from the location.

Figure 28:
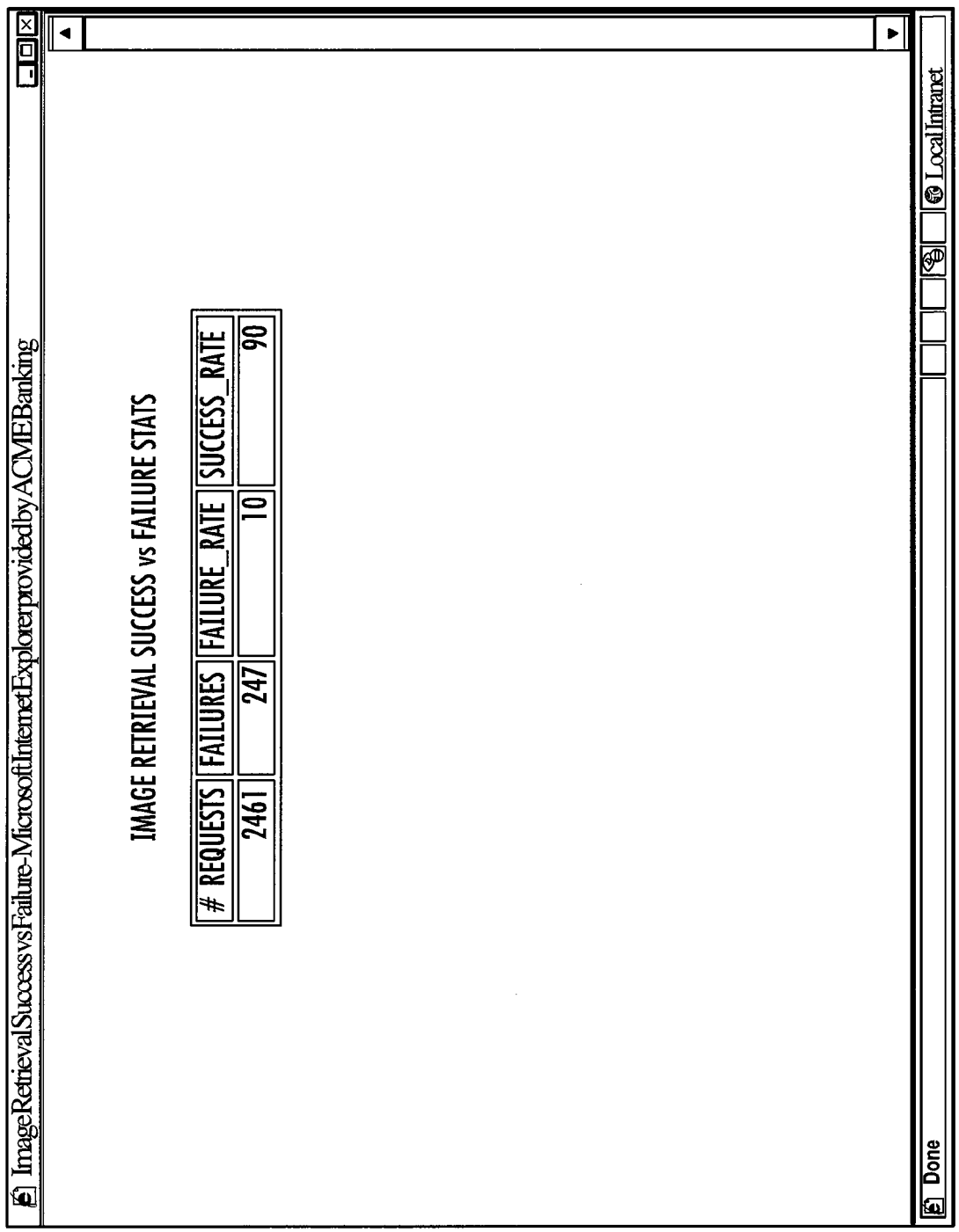
FIG. 28 illustrates an implementation of an Image Retrieval Success versus Failure Statistics report screen in accordance with at least one embodiment of the invention.

Referring to FIG. 28, an Image Retrieval Success versus Failure Statistics report screen displays information regarding all requests made to the image viewer application for an image. The requests column indicates the number of requests for the image. The failures column indicates the number of times the image was not returned for any number of reasons (e.g., could not locate image information repository, image information repository unavailable, network problems, image viewer application problems, etc.). The failure and success rates reduce the numbers of failures, and requests to a percentage of failures and successful requests, respectively.

As can be seen in the screens of FIGS. 6-28, the image viewer provides a user-friendly and intuitive environment for viewing and updating image information. Fields and screens are descriptively labeled and point and click navigation can be utilized for a user to access additional screens. Further, the screens offer the user a link to one or more help screens, such help screen(s) providing the user general guidance on the image viewer and/or particular screens. As will be apparent to those skilled in the art, the help links could call other applications such as an e-mail application or a help application to provide help services.

Image Access Application Programming Interface (API)

As discussed above, according to at least one embodiment of the invention, the image access server system comprises an image access API. The image access API provides a distributed interface for retrieval of image information, such as images and image index information, from any available image information repository to the image access server system. In at least one embodiment, the image information repositories available for access via the image access API may include one or more of the ViewPointe Archival Solutions, GA All Items Archive (provided by Banctec, Inc., CIMS mainframe, and DCIMS (licensed by Check Solutions) archive image information repositories.

The image access API allows current and new client applications to make image information requests remotely to image information repositories. It is a tool that provides client application developers an image information access interface for their applications without knowledge of the underlying image information access infrastructure. Through the image access API, applications can connect to image information repositories in a standard and flexible manner without having to be hard-coded to particular repository infrastructure.

The image access API is designed as a flexible, distributed object that connects to the image access server system for processing of all image information requests. In at least one embodiment, the image access API is built using Java technology and requires a Java interface from an application wishing to integrate image information data. The use of Java technology for the image access API permits a flexible architecture for networked objects and remote invocations.

Referring to FIGS. 1-2, the image access API is depicted generically as providing, the client(s) access to the image information repositories via the image access server system. In at least one embodiment, software is provided on the image access server system to implement the image access API. The image access API exposes methods that provide the interface to the image access server system. These methods hide the details required for communicating with the application server(s) of the image access server system and the repository software. Client applications call methods against the image access API.

The image access API comprises several functions for client applications:

Index Retrieval—The image access server system interrogates available index databases for image items that match a particular set of search criteria.

Image Retrieval—The image access server system retrieves images from the relevant repositories.

Logging—The image access server system tracks particular application requests and provides performance and volume statistics for analysis and review.

Billing—The image access server system provides billing capabilities for use with applications that process billable image information requests. Applications can use the image access server system to store, retrieve and transmit billing data to and from billing processing systems.

Image Access API Details

The ImageAccessAPI class is the base class for connection to the image access server system. Once instantiated, the ImageAccessAPI class acts as a proxy to the application server(s) of the image access server system. The ImageAccessAPIInterface object exposes all methods required for accessing the image access server system, submitting image information (e.g., index and images) requests, and storing volume and performance data. Using the exposed methods, an application can make requests for images and index information to the image access application server(s) for processing. When processing is complete, the image access API will format the response into one or more objects for presentation back to the requesting application. Providing this type of functionality simplifies the client, applications implementation by hiding the specific requirements of the image access application server(s) and back-end/repository layer from the client. FIG. 2 details an example of the relationship between the image access API object and a business application.

Two constructors can be used to create the image access API object and provide the application developer with the option to create a pool of objects or instantiate new objects whenever needed.

One constructor option is to instantiate the object without passing in any parameters. Once the object is created, it will bold all necessary variables and data required to connect to the image access application server(s), but will not connect until the first request is made. Then, the object will narrow the focus and obtain a remote reference to the particular object needed to complete the request transaction. Under this mode, the object is ready to connect to the image access application server(s) when needed. It instantiates very quickly and will not slow the applications launch while remote references to all image access application server beans are made. The first time the user tries to retrieve data, the connections will be made and the user will experience some delay. Once the remote references are obtained, all subsequent requests will process much quicker.

The second constructor option is to create the objects with a boolean true in the constructor. This will force the image access API object to obtain all remote references to the image access application server(s) at startup. The cost for the connection will be borne at instantiation, but the first user will not experience any delays when submitting the first request. This mode would be beneficial if the application developer wanted to pool these connection objects for use by many users.

The Java specification for the image access API is provided in Appendix B. Further, details of the image access API are provided below.

Image Access API Security

The image access API object is designed to reside on one or more image access application servers located within an organization's secure network. In at least one embodiment, image information is not encrypted when the image access server system fulfills a request instead the image access server system relies on the security of the client application server(s). Optionally, the image access API may include encryption routines to ensure privacy when delivering, image information, especially where the delivery is via the Internet.

The image access API depends on the security policy of the host server for authentication and control of client sessions to the image access server system. In at least one embodiment, the image access API is a server-side component and is only instantiated on a secure server(s) in the image access server system.

In at least one embodiment, when the image access API object is initialized, it issues a call to the image access server system and starts authentication processes. Once authenticated, the image access API object is ready to process requests on behalf of client, applications. Applications that leverage the image access API will be authenticated when the object is created or at time of first request, depending on the constructor used during the image access API object initialization process. However, each requesting application is responsible for verifying individual user IDs and passwords within their own applications. Image access API security is limited to authenticating at the application level. So, for example, if computers were to access the image access API through an internal image access application, the image access application would be authenticated. Individual users of the image access application, once authenticated by the image access application, could access the image access server system without additional security verification from the image access API. Optionally, the image access server system may be extended to authenticate and authorize individual users.

Image Access API General Methods void runTest( )

To ensure the image access API objects environment and connection to the image access application server(s) is up and functioning, the image access API object includes a self-test method. This test will connect to the remote image access application server(s) and obtain remote references to the exposed objects. This test will validate the environment, the objects validity, and the host servers right to access the image access application server(s). If the test completes the host server is ready to present image information requests for processing.

void release ( )

Purges all transient data that is associated with a particular request. All data required for accessing the image access application server(s) will not be purged.

String getServerAvailabilityNotice( );

The image access application server(s) will publish a message that will contain status information, such as scheduled downtime or failure notices, for client applications to use for feedback and information to end-users. This method connects to the image access application server(s) and retrieves the text message.

Image Access API Index Requests

The index requests feature of the image access API provides client applications with a method for querying the image information repositories for items that, match a particular set of query criteria. The image access server system will accept index requests from the image access API and queries the available image information repositories for items that match the query criteria.

For example, a request may be for index information regarding a particular check in which case the image access API (via the image access server system) queries the available image information repositories for check items that match the query criteria. The image access API will return one or more CheckItem objects to the client application, which comprise check information that matches the query criteria. Such check information can include check images and other documents or items that match the query criteria. The CheckItem object is a Java object that comprises all the data associated with a particular check or transaction document captured in the available image information repositories. If the lookup results in multiple items that match the query criteria, the image access API will return an array of Check tem objects.

To take advantage of index requests through the image access API, the client application must gather information, whether from internal information and/or from the user, on which to base a query into the image information repositories. In at least one embodiment, the query information must include, the capture date and either an account number or sequence number. Other data, including check serial number and/or amount, will help refine, searches but is not required.

Queries into the image information repositories are divided into two major types, Range Query or Multiple Query, and are submitted to the image access server system using a QueryCriteria object. A QueryCriteria object is a Java object that encapsulates the details of a query into the image information repositories. A QueryCriteria object comprises one or more QueryItem objects associated with one index request. A QueryItem object is a Java object that holds the set/get methods for capturing and retrieving a client application's query parameters and is used to store the specific data associated with an index request. The data that makes up a Range Query or a Multiple Query is stored in the QueryItem object(s).

A Range Query involves data ranges in the form of low and high values. In at least one embodiment, only one Range QueryItem object can be added to a QueryCriteria object for processing against the image access server system. If a client application attempts to submit more than one Range QueryItem object, an exception will be thrown.

A Multiple Query involves specifying a unique item using capture date and sequence number or capture date and account number, with the addition of additional criteria as required, such as amount and check serial number information, to refine the search. In at least one embodiment, multiple queries can be "batched" together by adding Multiple QueryItem objects to the QueryCriteria object.

In at least one embodiment, to limit the impact from any particular index request, the maximum number of CheckItems returned will be 3000.

Since the image access server system relies on multiple databases for index information, partial results maybe returned if one of the image information repositories is unavailable for request processing. In an effort to reduce the impact to client applications relying on image information query results, the image access API will return partial results if an error occurs when communicating with an image information repository. Client applications will be responsible for interrogating the results section of the image access API object after completion of an index request to determine whether the query results are complete.

Image Access API Index Request Methods void addIndexQuerySequenceCriteria( Date captureDate, long sequenceNumber)

throws ImageAccessAPIException;

Used to add sequence data to a QueryItem object that is immediately added to the, QueryCriteria object. This method can be called multiple times for the simultaneous request of several items with matching index data.

void addIndexQueryOnUsCriteria( Date captureDate, long accountNumber, long checkNumber, double amount)

throws ImageAccessAPIException;

Used to add OnUs data to a QueryItem object that is immediately added to the QueryCriteria object. This method can be called multiple times for the simultaneous request of several items with matching index data. OnUs items are documents associated with a particular organization. Items that are not OnUs items can be located through the image access API and the image access server system. Such item can be queried through the use of other query types including the sequence number query method detailed above, and transit item specific queries using the transit account number.

void addIndexQueryRangeCriteria( long abaNumber, long accountNumber,

Date startDate, Date endDate, double startAmount, double endAmount, long startCheckNumber, long endCheckNumber, long startSequenceNumber, long endSequenceNumber,)

throws ImageAccessAPIException;

Used to add a Range QueryItem to the QueryCriteria object. In at least one embodiment, only one Range QueryItem can be present in a QueryCriteria object. If a client application attempts to add a second Range QueryItem, an exception will be thrown.

void clearIndexQueryCriteria( );

Used to clear the contents of the QueryCriteria object from memory. This method must be called to clear aborted attempts to issue index requests. If not properly cleared, the results of an index request cannot be considered valid.

CheckItem[ ] executeIndexQuery( ) throws ImageAccessAPIException;

Sends the QueryCriteria object to the application server(s) of the image access server system for processing. The results will be in the form of one or more Check tem objects. Each CheckItem object comprises the data associated with a particular item.

Image Access API Image Requests

The image request methods of the image access API provide access to images in the image information repositories. The image access API hides all the image access details of the disparate image information repositories from the client application and only presents the complete or partial results of an image request.

In at least one embodiment, to process an image request, the image access API requires a client application to set the format and compression attributes of the image results before the request is submitted to the image access server system. Using the defined attributes, the image access server system will return images in a form that the client application expects.

The image access server system will accept image requests in the form of Check tem objects. It will use the data stored in these objects to determine where the requested item(s) is located (e.g., in which image information repository the image can be found) and retrieve it from the relevant image information repository. Images will be returned to the client application in ImageItem objects. An ImageItem object extends the Check tem object and includes the item's image data. For example, in the case of a check, the Check tem object will include the image of the front and back of the check. ImageItem objects include the items index data as well as image data. If multiple items were requested, an array of Imageless is returned.

The image access server system is responsible for presenting the images back to the client application in the requested format. Currently, the image access server system will return images either in a Java object with the images embedded in the object or via a URL. Once the client application server(s) has the URL, it would be allowed to retrieve the image file from the image access, application server(s) utilizing the HTTP protocol.

In at least one embodiment, the default format for returned images is BTIF, a registered extension of the TIFF image compression wrapper specification (currently managed by Adobe Corporation). The BTIF format provides the wrapping to place a check's front image and back image in the same file along with details on index information. Images returned in the BTIF format are displayed using an image viewing utility that provides additional functionality, such as zoom, rotate, etc.

In addition to response type, the client application can also request the image compression format. Currently, the available formats include G4 (a compression format defined by the International Telecommunication Union (ITU-T)), IOCA-JABIC (a raster and compression format defined by IBM Corporation), JPEG (the Joint Photographic Experts Group '(JPEG) format defined in ISO DIS 10918-1, "Digital compression and coding of continuous-tone still images (JPEG)", CCITT (now ITU-T) Recommendation T.81), and PNG (Portable Network Graphics (PNG) format specified in the World Wide Web Consortium (W3C) Recommendation of Oct. 1, 1996 and Internet Engineering Task Force (IETF) Request for Comment (RFC) 2083). In at least one embodiment, only G4, IOCA/ABIC, and JPEG images can be returned encapsulated in a BTIF wrapper.

In at least one embodiment, the image access server system, in order to reduce the impact on the network, has a limit of 30 returned images per request If a client application wishes to retrieve more than 30 images for a particular type of request, it will be responsible for grouping the requests into 30 image block requests and presenting those blocks to the image access API for processing.

Since the image access application server(s) processes image requests against multiple back-end image information repositories, these requests can provide, only partial results when only one or more image information repositories are available. Therefore, the image access API will provide additional information on the request using the result methods below.

Image Access API Image Request Methods
    int getImageQueryReturnType( );

Returns the current value of the return type attribute. This describes how the client application is requesting the image be returned. Options for return type are an array of ImageItem objects or a BTIF file. Only BTIF can be returned as a URL pointing to the image file.
    void setImageQueryReturnType(int rat);

Sets the value of the return type attribute.
    String getImageQueryFormat( );

Returns the current value of the image format attribute. This describes the compression format the client application is defining for the returned images. Options include PNG, JPEG, or native. Native formats include G4, JPEG, and IOCA/ABIC.
    void setImageQueryFormat(String iff);

Sets the value of the image format attribute.
    CheckItem[ ] getImageQueryCheckItems( );

Gets the current content of the CheckItem array.
    void setImageQueryCheckItems(CheckItem[ ] ii);

Sets the Check tem array. This array is a staging point for image requests to be sent to the image access application server(s).
    void addImageQueryCheckItem(CheckItem [ ] ii);

Adds a single CheckItem object to the Check tem array in preparation for an image request to the image access application server(s).
    void clearImageQueryCheckItems ( )

Flushes the current CheckItem objects stored in the Check tem array.
    String executeImageQueryToURL( ) throws ImageAccessAPIException;

Sends the CheckItem array to the image access application server(s) for processing. The result returned from the image access application server(s) is a uniform resource locator (URL) that points to the BTIF file located on the image access application server(s). The client application can retrieve the file using the URL and present it to the users via a BTIF image viewer.

ImageItem[ ] executeImageQuery( ) throws ImageAccessAPIException;

Sends the CheckItem array to the image access application server(s) for processing. The results are an ImageItem object or an array of ImageItem objects for multiple image requests. Images can be returned to the client application in the following formats: JPEG, PNG, or BTIF wrapped.

Image Access API Results
    boolean is Error ( )

Returns false unless a partial error occurred during the request.
    Int getErrorCode( )

Returns the error code associated with the results of a request.

| | |
|---|---|
| 0 | No Error (default value) |
| −1 | Error occurred during request. Only partial results were returned. |
| −2 | A fatal error occurred. No results are available. |

String getErrorMessage ( )

Returns messages associated with the partially or fully failed request. For example, "GA All Items Archive is not available for image requests. Only ViewPointe data was available."

Compilation of Component Deposit Items with Image Viewing

According to an embodiment, a system and method for processing financial information, specifically compiling and viewing images of component deposit items associated with corresponding credit transactions, are provided. A credit transaction may comprise one or more component deposit items. In at least one embodiment, a credit transaction is represented, for example, by a deposit and component deposit items are represented, for example, by one or more checks and/or one or more credit tickets constituting the deposit. In an illustration of this concept, a client may, for example, deposit a total of $150 into an account by depositing four separate checks of $25 each into the account at the same time and depositing $50 in cash to the teller. The credit transaction in this particular illustration is represented by the deposit totaling $150. Each individual $25 check deposited into the account represents a component deposit item and the $50 cash ticket represents a second credit of the $150 credit transaction. Component deposit items, or debits to the payor, and the cash ticket, a credit to the depositor, are also referred to as "offsets".

In at least one embodiment, the system and method allow clients to use disparate applications to reconstruct a credit transaction by compiling component deposit items associated with the credit transaction. A client may select a component deposit item in a compiled list and view a digital image of the component deposit item. In one embodiment, clients may include external customers of an organization, such as, for example, corporate customers and other large commercial customers of a banking institution, and may also include internal personnel of the organization, such as, for example, employees, associates and consultants.

In at least one embodiment, a client application may include an external client interface that allows the external client to directly request and receive financial information on credit transactions and component deposit items from the organization. In another embodiment, a client application may include the image viewer, described above and illustrated in FIGS. 6-28, for use by internal personnel of the organization.

In at least one embodiment, corporate clients of a financial institution may execute large credit transactions, including deposits that may consist of thousands of individual component deposit items. As a result, the financial institution may capture millions of component deposit items daily from its corporate clients. It is often useful or necessary, particularly in a high volume environment, to have the ability to compile component deposit items for a single credit transaction and to view images of specific component deposit items in an efficient and convenient manner. In another embodiment, described below, clients may request a batch process to automatically compile all component deposit items corresponding to a specific credit transaction, retrieve digital images of each component deposit item and have this information transmitted to them in a single batch transmission. The system and method of the present invention provide for efficient, convenient and reliable processing of financial information, including compilation of component deposit items associated with specific credit transactions and viewing of associated financial image information.

1. System Components

In at least one embodiment, the image access server system, described above in relation to FIGS. 1 and 2, processes and transmits data index information in addition to financial image information in response to client requests. Data index information may comprise, for example, capture date, account number, sequence number, amount, check number, location and other related information associated with a financial transaction. The one or more servers in the image access server system that function to process image information requests also function to process data index information requests using the index retrieval bean and the image retrieval bean discussed above as well as a drill down request bean, discussed below in more detail. The one or more servers may transmit data index information queries to various information repositories using the repository communications interface as described above. The one or more servers may also receive data index information responses from the information repositories via the repository communications interface as described above. Additionally, as described above, the image access server system may comprise one or more databases to store information, including copies of image information. In one embodiment, the image access server system uses the one or more databases to store information for batch processing of financial information.

In at least one embodiment, as discussed above, commands are received and processed by the image access server system through the image access API. The image access API is triggered to process the command (and the user-entered data, if any). In at least one embodiment, the image access API is programmed in the Java programming language, and the call of a method against the image access API causes the instantiation of one or more Enterprise Java Beans programs or beans in the image access server system to perform the functionality of the called methods, such as, for example, the index retrieval and image retrieval beans discussed above in relation to FIG. 2.

Figure 29:
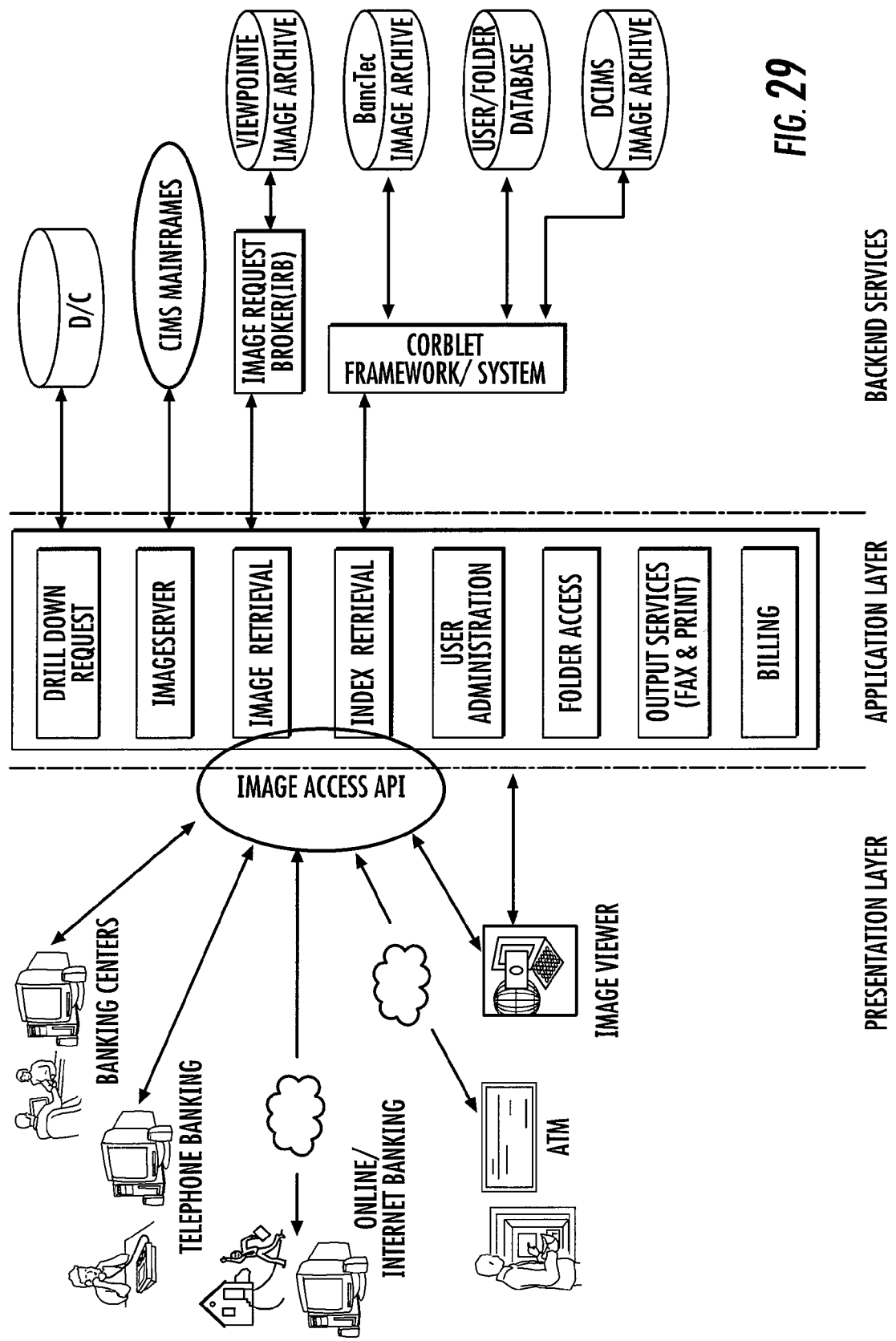
FIG. 29 illustrates a functional block diagram of an image access server system and the networked environment of at least one embodiment according to the present invention.

In one embodiment, as illustrated in FIG. 29, the image access server system also comprises a drill down request bean. The drill down request bean may process data index information. The drill down request bean may provide data index information request functionality with respect to the image access API. The drill down request bean initiates a connection with one or more information repositories or repository software over the repository communications interface. The drill down request bean facilitates storage of data processed, retrieved and/or created by the bean. For example, the data may be stored in an instantiated data bean class written in the Java programming language.

The drill down request bean further invokes the retrieval of the requested data index information from the information repository(ies). For example, the bean may execute a stored procedure associated with a particular information repository using user-entered data. Different stored procedures may be provided to retrieve different types of data index information and the bean would choose the particular stored procedure(s) for execution based upon the request. The bean may also, for example, interact with repository software associated with a particular repository to retrieve the requested data index information. The bean may further pass user-entered data and retrieved data index information to a screen generator (not shown) for use in display, as described in more detail above with respect to the index retrieval and image retrieval beans. The bean may optionally transmit the retrieved data index information to the client(s) for processing by the client application(s).

In one embodiment, the index retrieval bean and the image retrieval bean may operate in conjunction with the drill down request bean to provide image index information request and image request functionality in relation to one or more repositories and the image access API as described above. Specifically, as discussed below in more detail, data index information retrieved using the drill down request bean may be used as search parameters for use by the index retrieval bean and the image retrieval bean.

Specific descriptions of possible hardware platforms and software configurations used to implement the image access server system, the image access API and related interfaces are discussed above in relation to FIG. 2.

In one embodiment, as illustrated in FIG. 29, the networked environment comprises a Debit/Credit (D/C) information repository in addition to the one or more image information repositories discussed above, such as, for example, the Viewpointe Image Archive. The image access server system may be operably connected to the D/C information repository through the repository communications interface. The D/C information repository comprises data index information corresponding to credit transactions and component deposit items. Data index information in the D/C information repository may comprise, for example, capture date, sequence numbers, item amount, and item serial number associated with corresponding credit transactions and component deposit items. The D/C information repository may receive data index information queries from the image access server system, or transmit data index information to the image access server system, via the repository communications interface in a manner as described above with respect to the one or more image information repositories. Additionally, the D/C information repository may be operably connected to a transactions engine (TRX) (not shown) through a communications interface, where the TRX may comprise a combination of one or more servers and databases. The functionality of the TRX is described below.

As described above, the communications interfaces may include any type of communications network and may include communications connections within and/or outside an organization. In at least one embodiment, the communications network may be a public network such as the Internet. Communications systems used to implement the communications networks may include, but are not limited to, a telephone landline based modem network, a wireless network such as a cellular digital packet data (CDPD) network or a wireless local area network (LAN). Additionally, the communications network may be a private network in which information transmitted over the communications network is prevented from being readily accessible by systems or persons other than those associated with or permitted by the image access server system. The communications network may use encryption such that data transmitted on the communications network is encrypted using, for example, any commercially available or proprietary encryption scheme such as, but not limited to, 56-bit Data Encryption Standard (DES), 128-bit triple-DES, 128-bit RC4 and IDEA. In accordance with at least one embodiment of the invention, the image access server system uses HTTP connections over its communications interfaces, which connections may conform to the Secure Socket Layer (SSL) protocol in order to provide for secure information transport for data index information and image information.

The D/C information repository may include one or more relational databases and database management system (DBMS) software application such as Oracle, provided by Oracle Corporation, for storage and retrieval of data index information in accordance with the Structured Query Language (SQL) database format from the database. Such database management software may execute one or more stored procedures or scripts of SQL instructions operative to store or retrieve particular items of data index information arranged and formatted in accordance with a set of formatting instructions. Such stored procedures are typically stored or otherwise associated with the databases. For example, the database management software may execute one or more SQL stored procedures in response to a request from the image access server system to retrieve particular items of data index information in a format suitable for transmission to and display by the client(s) using a browser software application such as, for example, the Internet Explorer™ application provided by Microsoft Corporation. The databases (and their database management software) may communicate with the image access server system in accordance with the Open Database Connectivity (ODBC) standard developed by Microsoft Corporation. Certain items of data index information may be stored as encrypted information for purposes of maintaining the security of these items.

The D/C information repository may also include one or more mainframe databases and item server software for storage and retrieval of data index information in accordance with a mainframe database format for the mainframe database. Such item server software may execute one or more procedures operative to store or retrieve particular items of data index information arranged and formatted in accordance with a set of formatting instructions. For example, the item server may execute one or more procedures in response to a request from the image access server system to retrieve particular items of data index information, via various other mainframe software, in a format suitable for transmission to and display by the client(s) using a browser software application such as, for example, the Internet Explorer™ application provided by Microsoft Corporation. The mainframe database (and its item server software) may communicate with the image access server system in accordance with a proprietary or open communications protocol.

In one embodiment, the TRX may comprise a combination of one or more servers and databases to process and record all postings and financial transactions occurring in client accounts. The TRX may populate the D/C information repository with captured data regarding credit transactions and component deposit items. The TRX may also determine the likelihood that a set of individual component deposit items correctly match a corresponding credit transaction. The TRX may provide a status indicator to the D/C information repository to indicate the likelihood that a set of component deposit items are grouped correctly to match a single credit transaction.

As described above, referring to FIGS. 1 and 2, the image access API is depicted generically as providing client(s) access to disparate information repositories and image information repositories via the image access server system. In at least one embodiment, software is provided on the image access server system to implement the image access API, which exposes methods that provide the interface to the image access server system. These methods hide the details required for communicating with the application server(s) of the image access server system and the repository software. Client applications call methods against the image access API.

In one embodiment, as discussed above, the image access API may provide an index retrieval request function using the index retrieval bean, where the image access server system interrogates available information repositories comprising one or more databases for financial image information items that match a particular set of search criteria. Additionally, as discussed above, the image access API may provide an image retrieval function using the image retrieval bean, where the image access server system retrieves images and image index information from the relevant repositories using search criteria.

In one embodiment, the image access API may also provide a drill down request function using the drill down request bean, where the image access server system interrogates available information repositories comprising one or more databases for data index information items that match a particular set of search criteria. The drill down request function provides client applications with a method for querying the information repositories for items that match a particular set of query criteria. The image access server system will accept index requests from the image access API and queries the available image information repositories for items that match the query criteria.

For example, a request may be for index information regarding a particular check in which case the image access API (via the image access server system) queries the available information repositories for check items that match the query criteria. The image access API may return one or more CheckItem objects to the client application, which comprise check information that matches the query criteria. Such check information can include data index information that match the query criteria. The CheckItem object may be, for example, a Java object that comprises all the data associated with a particular check or transaction document captured in the available information repositories. If the lookup results in multiple items that match the query criteria, the image access API will return an array of CheckItem objects. The objects, query types and methods discussed above in the sections entitled "Image Access API Index Requests" and "Image Access API Index Request Methods" for implementing the index retrieval request function may be used to implement the drill down request function.

2. Operation

In at least one embodiment, a client enters a search request using a client application in order to examine a credit transaction by compiling the component deposit items constituting the credit transaction. As discussed above, the application may be, for example, the image viewer or a proprietary interface specific to an external client. If a client is using the image viewer application, the client may use one or more query screens to enter the search request, as shown, for example, in FIG. 8. The client request is received by the image access API.

The client request may comprise a set of search parameters that may include data index information such as, for example, a capture date, an account number and a sequence number identifying the credit transaction in question. Through the image access server system, the image access API routes the search parameters to a first information repository, such as, for example, the Viewpointe index database provided by Viewpointe Archive Services. In one embodiment, the first information repository comprises one or more databases containing, for example, data index information on debit and credit transactions, including capture date, account number, sequence number, amount, check number, location and other related information.

Using the drill down request function, the image access server system interrogates the first information repository for data index information items that match the set of search parameters of the request entered by the client. The image access server system retrieves a first set of data index information that matches the set of search parameters, and may transmit the first set of data index information to the client application through the image access API for display.

In one embodiment, the retrieved data index information may be displayed digitally on a computer screen. In another embodiment, the retrieved data index information may be transmitted to an alternate application for print out or facsimile transmission. In one embodiment, as shown in the screen shot of FIG. 30, the retrieved data index information is compiled in the form of a pick list and displayed on a screen, where each item of the pick list identifies a data index information item from the information repository that matches the search parameters. The items of the pick list may represent credit transactions and debit transactions matching the search parameters of the request entered by the client.

In one embodiment, an indicator is displayed adjacent to each data index information item in the pick list that corresponds to a credit transaction for which there exists information regarding component deposit items constituting the credit transaction, and for which there is an image contained in an image information repository, such as, for example, the Viewpointe image archive. The client may review the pick list and select a credit transaction item in the pick list that is noted by an indicator in order to compile the component deposit items constituting the selected credit transaction.

In one embodiment, the client selects an item in the pick list and a second search request is, for example, automatically transmitted through the API and received by the image access server system. A second set of search parameters may be created using the data index information of the credit transaction corresponding to the selected pick list item. Using the drill down request function, the image access server system interrogates a second information repository for data index information items that match the second set of search parameters.

In one embodiment, the second information repository may be, for example, the D/C information repository, which comprises data index information corresponding to credit transactions and component deposit items. The D/C information repository may be provided with a status indicator by the TRX to indicate the likelihood that a set of component deposit items are grouped correctly to match a single credit transaction.

In one embodiment, the image access server system retrieves a second set of data index information from the D/C information repository that matches the second set of search parameters. The second set of data index information represents component deposit items that constitute the selected credit transaction from the pick list. The image access server system may also retrieve the status indicator for the second set of data index information.

In one embodiment, if a value of the status indicator does not satisfy a threshold value, then it is likely that the component deposit items represented by the second set of data index information are not part of the same credit transaction. In this case, an error message may be transmitted to the client application through the image access API for display, and the second set of data index information is not transmitted to the client application. If the value of the status indicator satisfies the threshold value, then it is likely that the component deposit items represented by the second set of data index information are part of the same credit transaction. In this case, the image access server system may perform additional balancing logic to further ensure that the component deposit items are part of the same credit transaction.

In one embodiment, the image access server system may perform the balancing logic by summing the amount of the component deposit items represented by the second set of data index information and comparing the sum to the amount of the corresponding selected credit transaction. If the sum equals the amount of the credit transaction, it is at least highly likely that the component deposit items are part of the same credit transaction. The second set of data index information may then be transmitted by the image access server system to the client application through the image access API for display. Otherwise, if the sum does not equal the amount of the credit transaction, an error message may be transmitted to the client application through the image access API for display, and the second set of data index information is not transmitted to the client application.

In one embodiment, the retrieved second set of data index information or the error message may be displayed digitally on a computer screen. In another embodiment, the retrieved data index information or the error message may be transmitted to an alternate application for print out or facsimile transmission. In one embodiment, the retrieved second set of data index information may be compiled in the form of another pick list and displayed on a screen, where each item of the pick list identifies a data index information item from the second information repository that matches the search parameters. The pick list may display the credit transaction in addition to a compilation of component deposit items associated with the selected credit transaction. The client may review the pick list and select a component deposit item to view.

In one embodiment, the client selects an item in the pick list to view and a third search request may be, for example, automatically transmitted through the API and received by the image access server system. A third set of search parameters may be created using the data index information of the selected component deposit item corresponding to the selected pick list item to view. Using the index retrieval function, the image access server system interrogates an image information repository for image index information items that match the third set of search parameters.

In one embodiment, the image information repository may be, for example, the Viewpointe image archive. The image information repository may comprise financial information comprising images corresponding to credit transactions and component deposit items as well as image index information corresponding to the images. The image access server system may retrieve from the image information repository images and corresponding image index information that match the third set of search parameters using the index retrieval and image retrieval functions, and may transmit the retrieved financial information to the client application through the image access API for display. Alternately, the image access server system may transmit the retrieved financial information to an alternate application for print out or facsimile transmission.

3. Batch Processing

In another embodiment, a client may request a batch mode process to automatically compile all component deposit items corresponding to a specific credit transaction, retrieve digital images of each component deposit item and have all associated data index information and digital images transmitted to a client application at one time. Therefore, no client input is required during the batch mode process after an initial client search request is entered. The search request may comprise a set of search parameters that may include, for example, a capture date, an account number and a sequence number identifying the credit transaction in question. Through the image access server system, the image access API routes the search parameters to an information repository.

In one embodiment, the information repository may be, for example, the D/C information repository comprising data index information corresponding to credit transactions and component deposit items. Using the drill down request function, the image access server system interrogates the D/C information repository for data index information that matches the set of search parameters in the request entered by the client. The image access server system retrieves a set of data index information that matches the set of search parameters from the D/C information repository. As discussed above, the D/C information repository is provided with a status indicator by the TRX to indicate the likelihood that a set of component deposit items are grouped correctly to match a single credit transaction. The image access server may retrieve the status indicator for the retrieved set of data index information.

In one embodiment, as discussed above, a value of the status indicator is compared to a threshold value to determine the likelihood that the component deposit items represented by the retrieved set of data index information are part of the same credit transaction. Additionally, as discussed above, the image access server system may perform balancing logic to further ensure that the component deposit items match the credit transaction. Depending on the value of the status indicator and the results of the balancing logic, either the retrieved set of data index information or an error message may be transmitted by the image access server system through the API to the client application for display.

In one embodiment, the retrieved set of data index information or the error message may be displayed digitally on a computer screen. In another embodiment, the retrieved set of data index information or the error message may be transmitted to an alternate application for print out or facsimile transmission. In one embodiment, the retrieved data index information is compiled in the form of a pick list and displayed on a screen, where each item of the pick list identifies a data index information item from the information repository that matches the search parameters. The pick list displays the credit transaction in addition to a compilation of component deposit items associated with the credit transaction in question. In one embodiment, the pick list may be stored in one or more databases in the image access server system and may be simultaneously transmitted to the client application, or an alternate application, with all associated images and image index information in a single batch transmission.

In one embodiment, the retrieved set of data index information may be, for example, automatically transmitted by the image access server system to the image information repository one data index information item at a time. For each data index information item transmitted to the image information repository, a new set of search parameters is formed by using the data index information of the transmitted data index information item. Using the index retrieval function, the image access server system interrogates the image information repository for image index information items that match each set of search parameters.

In one embodiment, the image information repository may be, for example, the Viewpointe image archive. The image information repository may comprise financial information comprising images corresponding to credit transactions and component deposit items as well as image index information corresponding to the images. The image access server system may retrieve from the image information repository images and image index information that match each set of search parameters using the index retrieval and image retrieval functions, and may transmit the retrieved financial information to the client application through the image access API for display. Alternately, the image access server system may transmit the retrieved financial information to an alternate application for print out or facsimile transmission. In one embodiment, all images and image index information retrieved from the image information repository may be stored in one or more databases in the image access server system and may be simultaneously transmitted to the client application, or an alternate application, in a single batch transmission.

The detailed descriptions may have been presented in terms of program procedures executed on a computer or network of computers. These procedural descriptions and representations are the means used by those skilled in the art to most effectively convey the substance of their work to others skilled in the art. The embodiments of the invention may be implemented as apparent to those skilled in the art in hardware or software, or any combination thereof. The actual software code or hardware used to implement the invention is not limiting of the invention. Thus, the operation and behavior of the embodiments often will be described without specific reference to the actual software code or hardware components. The absence of such specific references is feasible because it is clearly understood that artisans of ordinary skill would be able to design software and hardware to implement the embodiments of the invention based on the description herein with only a reasonable effort and without undue experimentation.

A procedure is here, and generally, conceived to be a self-consistent sequence of operations leading to a desired result. These operations comprise physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, objects, attributes or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations of the invention described herein; the operations are machine operations. Useful machines for performing the operations of the invention include general purpose digital computers, special purpose computers or similar devices.

Each operation of the method may be executed on any general computer, such as a mainframe computer, personal computer or the like and pursuant to one or more, or a part of one or more, program modules or objects generated from any programming language, such as C++, Perl, Java, Fortran, etc. And still further, each operation, or a file, module, object or the like implementing each operation, may be executed by special purpose hardware or a circuit module designed for that purpose. For example, the invention may be implemented as a firmware program loaded into non-volatile storage or a software program loaded from or into a data storage medium as machine-readable code, such code being, instructions executable by an array of logic elements such as a processor or other digital signal processing unit. Any data handled in such processing or created as a result of such processing can be stored in any memory as is conventional in the art. By way of example, such data may be stored in a temporary memory, such as in the RAM of a given computer system or subsystem. In addition, or in the alternative, such data may be stored in longer-term storage devices, for example, magnetic disks, rewritable optical disks, and so on.

In the case of diagrams depicted, herein, they are provided by way of example. There may be variations to these diagrams or the operations described herein without departing from the spirit of the invention. For instance, in certain cases, the operations may be performed in differing order, or operations may be added, deleted or modified.

Embodiments of the invention may be implemented as an article of manufacture comprising a computer usable medium having computer readable program code means therein for executing the method operations of the invention, a program storage device readable by a machine, tangibly embodying a program of instructions executable by a machine to perform the method operations of the invention, or a computer program product. Such an article of manufacture, program storage device, or computer program product may include, but is not limited to, CD-ROM, CD-R, CD-RW, diskettes, tapes, hard drives, computer system memory (e.g., RAM or ROM), and/or the electronic, magnetic, optical, biological or other similar embodiments of the program (including, but not limited to, a carrier wave modulated, or otherwise manipulated, to convey instructions that can be read, demodulated/decoded and executed by a computer). Indeed, the article of manufacture, program storage device or computer program product may include, any solid or fluid transmission medium, whether magnetic, biological, optical, or the like, for storing or transmitting signals readable by a machine for controlling the operation of a general or special purpose computer according to any or all methods of the invention and/or to structure its components in accordance with a system of the invention.

Embodiments of the invention may also be implemented in a system. A system may comprise a computer that includes a processor and a memory device and optionally, a storage device, an output device such as a video display and/or an input device such as a keyboard or computer mouse. Moreover, a system may comprise an interconnected network of computers. Computers may equally be in stand-alone form (such as the traditional desktop personal computer) or integrated into another apparatus (such as a cellular telephone).

The system may be specially constructed for the required purposes to perform, for example, the method of the invention or the system may comprise one or more general purpose computers as selectively activated or reconfigured by a computer program in accordance with the teachings herein stored in the computer(s). The system could also be implemented in whole or in part as a hard-wired circuit or as a circuit configuration fabricated into an application-specific integrated circuit. The invention presented herein is not inherently related to a particular computer system or other apparatus. The required structure for a variety of these systems will appear from the description given.

While this invention has been described in relation to certain embodiments, it will be understood by those skilled in the art that other embodiments according to the generic principles disclosed herein, modifications to the disclosed embodiments and changes in the details of construction, arrangement of parts, compositions, processes, structures and materials selection all may be made without departing from the spirit and, scope of the invention. Changes, including equivalent structures, acts, materials, etc., may be made, within the purview of the appended claims, without departing from the scope and spirit of the invention in its aspects. Thus, it should be understood that the above described embodiments have been provided by way of example rather than as a limitation of the invention and that the specification and drawing(s) are, accordingly, to be regarded in an illustrative rather than a restrictive sense. As such, the invention is not intended to be limited to the embodiments shown above but rather is to be accorded the widest scope consistent with the principles and novel features disclosed in any fashion herein.

APPENDIX A

Load Balancing and Failover

1. Load Balancing and Failover
    1.1. Load Balancing
        1.1.1. Image viewer will route logon requests to the least busy application interface.
        1.1.2. In the event that load statistics are not available, image viewer will route logon requests to the next available application interface.
    1.2. Failover Handling
        1.2.1. Secondary Server Failover
            1.2.1.1. In the event of a failure of the primary Web, application, database, fax, or Item Client server within site A, the secondary server within site A will automatically handle the transactions
            1.2.1.2. In the event of a failure of the primary Web, application, database, fax, or Item Client server within site B, the secondary server within site B will automatically handle the transactions
        1.2.2. Web Server Failover
            1.2.2.1. In the event of a catastrophic Web server failure at site A (both the primary and secondary Web server), all production traffic will be re-routed to site B
            1.2.2.2. In the event of a catastrophic Web server failure in site B (both the primary and secondary Web server), all production traffic will be re-routed to site A
        1.2.3. Application Server Failover
            1.2.3.1. In the event of a catastrophic application server failure in site A (both the primary and secondary application server), all production traffic will be rerouted to site B
            1.2.3.2. In the event of a catastrophic application server failure in site B (both the primary and secondary application server), all production traffic will be re-routed to site B 1.2.4. DataBase Server Failover
   1.2.4.1. In the event of a catastrophic database server failure in site A (both the primary and secondary database server), all production traffic will be re-routed to any remaining sites
1.2.5. Item Client server failover
   1.2.5.1. In the event of a catastrophic Item Client server failure in site A, Item Client traffic will be re-routed to site B
   1.2.5.2. In the event of a catastrophic Item Client server failure in site B, Item Client traffic will be re-routed to site A
1.2.6. Fax Server Failover
   1.2.6.1. In the event of a catastrophic fax server failure in site A, jobs will be re-routed to site B
   1.2.6.2. In the event of a catastrophic fax server failure in site B, jobs will be re-routed to site A

APPENDIX B

Image Access API Interface

```
public interface ImageAccessAPIInterface extends ImageAccessAPIComponent{
    public static final String IMAGEFORMAT_ASIS=
ImageSymbols.IMAGEFORMAT_ASIS;
    public static final String IMAGEFORMAT_DEFAULT=
ImageSymbols.IMAGEFORMAT_DEFAULT;
    public static final String IMAGEFORMAT_JPG=
ImageSymbols.IMAGEFORMAT_JPG;
    public static final String IMAGEFORMAT_PNG=
ImageSymbols.IMAGEFORMAT_PNG;
    public static final int RETURNTYPE_BTIF=ImageSymbols.RETIJRNTYPE_BTIF;
    public static final int RETURNTYPE_DEFAULT=
ImageSymbols.RETURNTYPE_DEFAULT;
    public static final int RETURNTYPE_ITEMARRAY=
ImageSymbols.RETURNTYPE_ITEMARRAY;
    public boolean runTest ( );
    public void release ( );
    public void addIndexQuerySequenceCriteria(
    Date captureDate,
    long sequenceNumber
    ) throws ImageAccessAPIException;
    public void addIndexQueryOnUsCriteria(
    long accountNumber,
    long checkNumber,
    double amount
    ) throws ImageAccessAPIException;
    public void addIndexQueryRangeCriteria(
    long abaNumber, long accountNumber,
    Date startDate, Date endDate,
    double startAmount, double endAmount,
    long startCheckNumber, long endCheckNumber,
    long startSequenceNumber, long endSequenceNumber
    ) throws ImageAccessAPIException;
    public void clearIndexQueryCriteria( );
    public CheckItem[ ] executeIndexQuery ( ) throws ImageAccessAPIException;
    }
    public int getImageQueryReturnType ( );
    public void setImageQueryReturnType(int rt);
    public String getImageQueryFormat( );
    public void setImageQueryFormat(String iff);
    public CheckItem[ ] getImageQueryCheckItems ( );
    public void settmageQueryCheckItems(CheckItem[ ] ii);
    public void addImageQueryCheckItem(CheckItem cii);
    public void clearImageQueryCheckItems ( );
    public String executeImageQueryToURL( ) throws ImageAccessAPIException;
    public ImageItem[ ] executeImageQuery( ) throws ImageAccessAPIException;
    public String getServerAvailabilityNotice ( );
}
```

What is claimed is:

1. A method for processing financial information, the method comprising:
receiving a first client request through an application program interface (API), wherein the API is accessed by one of a plurality of disparate types of client applications, and wherein the first client request comprises a first set of search parameters;
retrieving a first set of data index information through the API, from a first information repository of a plurality of disparate information repositories, using the first set of search parameters, wherein the first information repository comprises data index information corresponding to debit transactions and credit transactions;
transmitting the first set of data index information to the client application through the API for display;
receiving a second client request through the API from the client application, wherein the second client request comprises a second set of search parameters, and wherein the second set of search parameters is formed using the first set of data index information;
retrieving a second set of data index information through the API, from a second information repository of the plurality of disparate information repositories, using the second set of search parameters, wherein the second information repository comprises data index information corresponding to credit transactions and component deposit items, and wherein a credit transaction comprises one or more corresponding component deposit items;
transmitting at least one of the second set of data index information and an error message to the client application through the API for display;
receiving a third client request through the API from the client application, wherein the third client request comprises a third set of search parameters, and wherein the third set of search parameters is formed using the second set of data index information;
retrieving financial image information, from an image information repository of a plurality of disparate image information repositories, using the third set of search parameters, wherein the image information repository comprises financial image information comprising images corresponding to credit transactions and component deposit items and image index information corresponding to the images; and
transmitting the retrieved financial image information to the client application through the API for display.

2. A method for processing financial information, the method comprising:
receiving a first client request through an application program interface (API), wherein the API is accessed by one of a plurality of disparate types of client applications, and wherein the first client request comprises a first set of search parameters;

retrieving a first set of data index information through the API, from a first information repository of a plurality of disparate information repositories, using the first set of search parameters, wherein the first information repository comprises data index information corresponding to debit transactions and credit transactions;

transmitting the first set of data index information to the client application through the API for display;

receiving a second client request through the API, wherein the second client request comprises a second set of search parameters, and wherein the second set of search parameters is formed using the first set of data index information;

retrieving a second set of data index information through the API, from a second information repository of the plurality of disparate information repositories, using the second set of search parameters, wherein the second information repository comprises data index information corresponding to credit transactions and component deposit items, and wherein a credit transaction comprises one or more corresponding component deposit items; and transmitting at least one of the second set of data index information and an error message to the client application through the API for display.

3. The method of claim 2, wherein the step of receiving the first client request comprises:
entering the first client request using a set of query screens of the client application, wherein the first set of search parameters comprises at least one of a capture date, an account number and a sequence number of a corresponding credit transaction; and
transmitting the first set of search parameters to the API.

4. The method of claim 2, wherein the step of retrieving the first set of data index information comprises:
comparing the first set of search parameters to the data index information in the first information repository;
determining if the first set of search parameters matches any of the data index information in the first information repository; and
transmitting to the API any data index information in the first information repository matching the first set of search parameters.

5. The method of claim 2, wherein the transmitting step comprises:
displaying the first set of data index information in a list format; and displaying an indicator adjacent to each item in the list corresponding to a credit transaction.

6. The method of claim 2, wherein the plurality of disparate types of client applications comprises external client interfaces and internal applications.

7. The method of claim 2, wherein the step of receiving the second client request comprises:
selecting a data index information item from the first set of data index information using the client application, wherein the selected data index information item corresponds to a credit transaction;
forming the second set of search parameters using the selected data index information item in the first set of data index information, wherein the second set of search parameters comprises at least one of a capture date, an account number and a sequence number associated with the selected data index information item from the first set of data index information; and
transmitting the second set of search parameters to the API.

8. The method of claim 2, wherein the step of retrieving the second set of data index information comprises:
comparing the second set of search parameters to the data index information in the second information repository;
determining if the second set of search parameters matches any of the data index information in the second information repository;
summing an amount of one or more component deposit items corresponding to data index information in the second information repository that match the second set of search parameters;
equating the sum of the amount of the component deposit items to an amount of a corresponding credit transaction; and
transmitting to the API the data index information in the second information repository matching the second set of search parameters if the sum of the amount of the component deposit items equals the amount of the corresponding credit transaction.

9. The method of claim 8, further comprising after the transmitting step:
transmitting to the API an error message if the sum of the amount of the component deposit items does not equal the amount of the corresponding credit transaction.

10. The method of claim 9, wherein the transmitting steps comprise:
displaying at least one of the second set of data index information in a list format and the error message.

11. The method of claim 2, wherein each of the plurality of disparate information repositories are incompatible with each other.

12. The method of claim 2, further comprising:
receiving a third client request through the API, wherein the third client request comprises a third set of search parameters, and wherein the third set of search parameters is formed using the second set of data index information;
retrieving financial image information, from an image information repository of a plurality of disparate image information repositories, using the third set of search parameters, wherein the image information repository comprises financial image information comprising images corresponding to credit transactions and component deposit items and image index information corresponding to the images; and
transmitting the retrieved financial image information to the client application through the API for display.

13. The method of claim 12, wherein the step of receiving the third client request comprises:
selecting a data index information item in the second set of data index information using the client application, wherein the selected data index information item corresponds to at least one of a credit transaction and a component deposit item;
forming the third set of search parameters using the selected data index information item, wherein the third set of search parameters comprises at least one of a capture date, an account number and a sequence number associated with the selected data index information item in the second set of data index information; and
transmitting the second set of search parameters to the API.

14. The method of claim 12, wherein the step of retrieving financial image information comprises:
comparing the third set of search parameters to the image index information in the image information repository;
determining if the third set of search parameters matches the image index information in the image information repository; and returning to the API financial image information corresponding to any image index information in the image information repository matching the third set of search parameters.

15. The method of claim 12, wherein the data index information and the image index information comprise at least one of a sequence number, a check serial number, an amount, an account number, a capture date and a location.

16. The method of claim 12, wherein each of the plurality of disparate image information repositories are incompatible with each other.

17. A method for processing financial information, the method comprising:
receiving a client request through an application program interface (API), wherein the API is accessed by one of a plurality of disparate types of client applications, and wherein the client request comprises a set of search parameters;
comparing the set of search parameters to data index information in an information repository of a plurality of disparate information repositories wherein the information repository comprises data index information corresponding to credit transactions and component deposit items, and wherein a credit transaction comprises one or more corresponding component deposit items;
determining if the set of search parameters matches any of the data index information in the information repository;
summing an amount of one or more component deposit items corresponding to data index information in the information repository that match the set of search parameters;
equating the sum of the amount of the component deposit items to an amount of a corresponding credit transaction;
transmitting to the API the data index information in the information repository matching the set of search parameters if the sum of the amount of the component deposit items equals the amount of the corresponding credit transaction to retrieve a set of data index information; and
retrieving financial image information, from an image information repository of a plurality of disparate image information repositories, for the retrieved data index information, wherein the image information repository comprises financial image information comprising images corresponding to credit transactions and component deposit items and image index information corresponding to the images.

18. The method of claim 17, further comprising after the transmitting step:
transmitting to the API an error message if the sum of the amount of the component deposit items does not equal the amount of the corresponding credit transaction.

19. The method of claim 18, wherein the transmitting steps comprise:
transmitting at least one of the retrieved set of data index information, the retrieved financial image information and the error message to the client application through the API for display on a screen.

20. The method of claim 18, wherein the transmitting steps comprise:
transmitting at least one of the retrieved set of data index information, the retrieved financial image information and the error message to an alternate application through the API for print out.

21. A system for processing financial information, comprising:
an application program interface (API) accessible by a plurality of disparate types of client applications;
a first information repository comprising data index information corresponding to debit transactions and credit transactions,
a second information repository comprising data index information corresponding to credit transactions and component deposit items, wherein a credit transaction comprises one or more corresponding component deposit items;
an image information repository comprising financial image information comprising images corresponding to credit transactions and component deposit items and image index information corresponding to the images; and
a plurality of servers operably connected to the API:
a. to retrieve financial information from a plurality of disparate financial information repositories comprising the first information repository, the second information repository and the image information repository in response to one or more client requests received through the API, wherein the financial information comprises data index information and financial image information, and
b. to transmit the retrieved financial information to a client application through the API for display.

22. The system of claim 21, wherein the plurality of disparate financial information repositories are incompatible with each other.

23. The system of claim 21, wherein the plurality of servers comprises at least one of a screen generator to facilitate display of retrieved data index information and financial image information as HTML or XML pages, a user administration bean to retrieve and store user administration information, a folder access bean to provide folders for data index information and financial image information search results and requests, an output services bean to provide remote printing and fax services, and a billing bean to provide billing with respect to data index information and financial image information requests.

24. The system of claim 21, wherein the plurality of servers to retrieve financial information comprises:
a first server to receive a first client request through the API, to retrieve a first set of data index information from the first information repository using a first set of search parameters of the first client request, and to transmit the first set of data index information to a client application through the API for display;
a second server to receive a second client request through the API, wherein the second client request comprises a second set of search parameters that are formed using the first set of data index information, to retrieve a second set of data index information from the second information repository using the second set of search parameters, and to transmit the second set of data index information to the client application through the API for display; and
a third server to receive a third client request through the API, wherein the third client request comprises a third set of search parameters that are formed using the second set of data index information, to retrieve financial image information from the image information repository using the third set of search parameters, and to transmit the retrieved financial image information to the client application through the API for display.

25. The system of claim 21, further comprising a CORBA client comprising one or more objects with properties defining a primary and a backup site for connection, wherein if a connection between the CORBA client and the primary site becomes unavailable, an object request broker instantiated for the CORBA client is destroyed and a new instance of an ORB is created with modified properties to make a connection to the backup site.

26. The system of claim 21, wherein the plurality of disparate types of client applications comprises external client interfaces and internal applications.

27. The system of claim 21, wherein one or more of the plurality of servers comprises at least one of a drill down request bean, an index retrieval bean and an image retrieval bean.

28. A computer-readable medium encoded with a plurality of processor-executable instructions for:
receiving a first client request through an application program interface (API), wherein the API is accessed by one of a plurality of disparate types of client applications, and wherein the first client request comprises a first set of search parameters;
retrieving a first set of data index information through the API, from a first information repository of a plurality of disparate information repositories, using the first set of search parameters, wherein the first information repository comprises data index information corresponding to debit transactions and credit transactions;
transmitting the first set of data index information to the client application through the API for display;
receiving a second client request through the API, wherein the second client request comprises a second set of search parameters, and wherein the second set of search parameters is formed using the first set of data index information;
retrieving a second set of data index information through the API, from a second information repository of the plurality of disparate information repositories, using the second set of search parameters, wherein the second information repository comprises data index information corresponding to credit transactions and component deposit items, and wherein a credit transaction comprises one or more corresponding component deposit items; and
transmitting at least one of the second set of data index information and an error message to the client application through the API for display.

29. The computer-readable medium of claim 28, wherein the instruction for receiving the first client request comprises:
entering the first client request using a set of query screens of the client application, wherein the first set of search parameters comprises at least one of a capture date, an account number and a sequence number of a corresponding credit transaction; and
transmitting the first set of search parameters to the API.

30. The computer-readable medium of claim 28, wherein the instruction for retrieving the first set of data index information comprises:
comparing the first set of search parameters to the data index information in the first information repository;
determining if the first set of search parameters matches any of the data index information in the first information repository; and
transmitting to the API any data index information in the first information repository matching the first set of search parameters.

31. The computer-readable medium of claim 28, wherein the instruction for transmitting comprises:
displaying the first set of data index information in a list format; and displaying an indicator adjacent to each item in the list corresponding to a credit transaction.

32. The computer-readable medium of claim 28, wherein the instruction for receiving the second client request comprises:
selecting a data index information item from the first set of data index information using the client application, wherein the selected data index information item corresponds to a credit transaction;
forming the second set of search parameters using the selected data index information item in the first set of data index information, wherein the second set of search parameters comprises at least one of a capture date, an account number and a sequence number associated with the selected data index information item from the first set of data index information; and
transmitting the second set of search parameters to the API.

33. The computer-readable medium of claim 28, wherein the instruction for retrieving the second set of data index information comprises:
comparing the second set of search parameters to the data index information in the second information repository;
determining if the second set of search parameters matches any of the data index information in the second information repository;
summing an amount of one or more component deposit items corresponding to data index information in the second information repository that match the second set of search parameters;
equating the sum of the amount of the component deposit items to an amount of a corresponding credit transaction; and
transmitting to the API the data index information in the second information repository matching the second set of search parameters if the sum of the amount of the component deposit items equals the amount of the corresponding credit transaction.

34. The computer-readable medium of claim 33, further comprising after the instruction for transmitting:
transmitting to the API an error message if the sum of the amount of the component deposit items does not equal the amount of the corresponding credit transaction.

35. The computer-readable medium of claim 34, wherein the instructions for transmitting comprise:
displaying at least one of the second set of data index information in a list format and the error message.

36. The computer-readable medium of claim 28, wherein each of the plurality of disparate information repositories are incompatible with each other.

37. The computer-readable medium of claim 28, further comprising instructions for:
receiving a third client request through the API, wherein the third client request comprises a third set of search parameters, and wherein the third set of search parameters is formed using the second set of data index information;
retrieving financial image information, from an image information repository of a plurality of disparate image information repositories, using the third set of search parameters, wherein the image information repository comprises financial image information comprising images corresponding to credit transactions and component deposit items and image index information corresponding to the images; and
transmitting the retrieved financial image information to the client application through the API for display.

38. The computer-readable medium of claim 37, wherein the instruction for receiving the third client request comprises:

selecting a data index information item in the second set of data index information using the client application, wherein the selected data index information item corresponds to at least one of a credit transaction and a component deposit item;

forming the third set of search parameters using the selected data index information item, wherein the third set of search parameters comprises at least one of a capture date, an account number and a sequence number associated with the selected data index information item in the second set of data index information; and transmitting the second set of search parameters to the API.

39. The computer-readable medium of claim 37, wherein the instruction for retrieving financial image information comprises:

comparing the third set of search parameters to the image index information in the image information repository;

determining if the third set of search parameters matches the image index information in the image information repository; and returning to the API financial image information corresponding to any image index information in the image information repository matching the third set of search parameters.

40. The computer-readable medium of claim 37, wherein the data index information and the image index information comprise at least one of a sequence number, a check serial number, an amount, an account number, a capture date and a location.

41. The computer-readable medium of claim 37, wherein each of the plurality of disparate image information repositories are incompatible with each other.

42. A computer-readable medium encoded with a plurality of processor executable instructions for:

receiving a client request through an application program interface (API), wherein the API is accessed by one of a plurality of disparate types of client applications, and wherein the client request comprises a set of search parameters;

comparing the set of search parameters to data index information in an information repository of a plurality of disparate information repositories wherein the information repository comprises data index information corresponding to credit transactions and component deposit items, and wherein a credit transaction comprises one or more corresponding component deposit items;

determining if the set of search parameters matches any of the data index information in the information repository;

summing an amount of one or more component deposit items corresponding to data index information in the information repository that match the set of search parameters;

equating the sum of the amount of the component deposit items to an amount of a corresponding credit transaction;

transmitting to the API the data index information in the information repository matching the set of search parameters if the sum of the amount of the component deposit items equals the amount of the corresponding credit transaction to retrieve a set of data index information; and retrieving financial image information, from an image information repository of a plurality of disparate image information repositories, for the retrieved data index information, wherein the image information repository comprises financial image information comprising images corresponding to credit transactions and component deposit items and image index information corresponding to the images.

43. The computer-readable medium of claim 42, further comprising after the instruction for transmitting:

transmitting to the API an error message if the sum of the amount of the component deposit items does not equal the amount of the corresponding credit transaction.

44. The computer-readable medium of claim 43, wherein the instructions for transmitting comprise:

transmitting at least one of the retrieved set of data index information, the retrieved financial image information and the error message to the client application through the API for display on a screen.

45. The computer-readable medium of claim 43, wherein the instructions for transmitting comprise:

transmitting at least one of the retrieved set of data index information, the retrieved financial image information and the error message to an alternate application through the API for print out.

* * * * *